United States Patent
Sworen et al.

(10) Patent No.: US 10,047,245 B2
(45) Date of Patent: Aug. 14, 2018

(54) NON-FLUORINATED AND PARTIALLY FLUORINATED POLYMERS

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Tatsiana Haidzinskaya, Newark, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 14/862,293

(22) Filed: Sep. 23, 2015

(65) Prior Publication Data

US 2016/0090505 A1 Mar. 31, 2016

Related U.S. Application Data

(60) Provisional application No. 62/055,944, filed on Sep. 26, 2014.

(51) Int. Cl.

| C09D 175/04 | (2006.01) |
|---|---|
| D06M 15/273 | (2006.01) |
| D06M 15/564 | (2006.01) |
| C08G 18/78 | (2006.01) |
| C08G 18/79 | (2006.01) |
| C08G 18/32 | (2006.01) |

(52) U.S. Cl.
CPC ....... *C09D 175/04* (2013.01); *C08G 18/3221* (2013.01); *C08G 18/7831* (2013.01); *C08G 18/792* (2013.01); *D06M 15/273* (2013.01); *D06M 15/564* (2013.01); *D10B 2201/02* (2013.01); *D10B 2331/04* (2013.01)

(58) Field of Classification Search
CPC .......................... C09D 175/04; C08G 18/6484
See application file for complete search history.

(56) References Cited

U.S. PATENT DOCUMENTS

| 3,049,513 | A |  | 8/1962 | Damusis | |
|---|---|---|---|---|---|
| 3,505,001 | A |  | 4/1970 | Wagner | |
| 3,748,294 | A | * | 7/1973 | Kershaw et al. | G08G 18/0871 524/590 |
| 4,018,688 | A | * | 4/1977 | Pracht | B01J 13/16 510/523 |
| 4,075,411 | A |  | 2/1978 | Dickstein | |
| 4,081,384 | A | * | 3/1978 | Pracht | B01J 13/16 206/0.5 |
| 4,304,683 | A |  | 12/1981 | Morinaka et al. | |
| 4,360,447 | A |  | 11/1982 | Morinaka et al. | |
| 4,859,780 | A | * | 8/1989 | Molock | C08F 8/00 540/531 |
| 5,866,657 | A | * | 2/1999 | Tominaga | C08G 18/6229 524/366 |
| 6,479,605 | B1 |  | 11/2002 | Franchina | |
| 6,790,898 | B2 | * | 9/2004 | Lee | C08F 265/06 524/458 |
| 6,864,312 | B2 | * | 3/2005 | Moore | C08G 18/0828 524/591 |
| 7,344,758 | B2 |  | 3/2008 | Franchina et al. | |
| 8,349,986 | B2 | * | 1/2013 | Rukavina | B32B 17/1077 244/121 |
| 8,586,697 | B2 |  | 11/2013 | Elizalde et al. | |
| 2003/0120101 | A1 |  | 6/2003 | Lai | |
| 2005/0085573 | A1 |  | 4/2005 | Sandner et al. | |
| 2006/0052556 | A1 |  | 3/2006 | Franchina et al. | |
| 2006/0151739 | A1 |  | 7/2006 | Sandner et al. | |
| 2006/0241199 | A1 | * | 10/2006 | O'Connor | C08G 18/4081 521/172 |
| 2007/0009663 | A1 |  | 1/2007 | Wang et al. | |
| 2007/0014927 | A1 |  | 1/2007 | Buckanin et al. | |
| 2007/0167601 | A1 |  | 7/2007 | Rukavina et al. | |
| 2008/0146750 | A1 |  | 6/2008 | Corn et al. | |
| 2010/0124649 | A1 | * | 5/2010 | Rukavina | B32B 27/40 428/292.1 |
| 2010/0190397 | A1 |  | 7/2010 | Duschek et al. | |
| 2013/0288066 | A1 | * | 10/2013 | Reiners | C08G 18/284 428/540 |
| 2014/0031483 | A1 |  | 1/2014 | Elizalde et al. | |
| 2014/0295724 | A1 |  | 10/2014 | Sworen et al. | |
| 2017/0268165 | A1 | * | 9/2017 | Sworen | D06M 15/263 |

FOREIGN PATENT DOCUMENTS

| CN | 101914185 A | 12/2010 |
|---|---|---|
| EP | 2415879 | 8/2010 |

(Continued)

OTHER PUBLICATIONS

Machine Translation of JP 05331130 A. (Year: 1993).*

(Continued)

*Primary Examiner* — Michael M Dollinger

(57) ABSTRACT

A polymer composition with (A) a first poly(meth)acrylate polymer or urethane polymer; and (B) a second poly(meth)acrylate polymer or urethane polymer which has a residue X incorporated therein, where X is the residue of a cyclic or acyclic sugar alcohol which is substituted with at least one —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof.

14 Claims, No Drawings

(56) References Cited

FOREIGN PATENT DOCUMENTS

| | | | |
|---|---|---|---|
| GB | 887387 | | 1/1962 |
| GB | 1360007 | | 7/1974 |
| JP | 1972003477 | B | 1/1972 |
| JP | 1973004940 | | 1/1973 |
| JP | 1983079008 | | 5/1983 |
| JP | 1985045678 | B2 | 10/1985 |
| JP | 05331130 | A * | 12/1993 |
| JP | 05331130 | A | 12/1993 |
| KR | 2009002894 | A1 | 1/2009 |
| WO | 200037525 | A1 | 6/2000 |
| WO | 2003089477 | A1 | 10/2003 |
| WO | 2006024669 | A1 | 3/2006 |
| WO | 200640333 | A1 | 4/2006 |
| WO | 2008/022985 | A1 | 2/2008 |
| WO | 2009015136 | A1 | 1/2009 |
| WO | 2011124710 | A | 10/2011 |
| WO | 2014/160906 | A2 | 10/2014 |

OTHER PUBLICATIONS

PCT/ISA/220 for PCT/US2015/051586, dated Dec. 17, 2015.
Mao et al., Effect of additives on microstructure and properties of polyurethane coating film for fabrics, Fangzhi Xuebao (1996), 17(2), 4-7 (Abstract attached).

* cited by examiner

NON-FLUORINATED AND PARTIALLY FLUORINATED POLYMERS

FIELD OF INVENTION

This invention relates to polymer mixtures and core-shell polymer compositions comprising two urethane and/or acrylic polymers, where at least one polymer incorporates a residue of a substituted cyclic or acyclic sugar alcohol.

BACKGROUND OF THE INVENTION

Various compositions are known to be useful as treating agents to provide water repellency and optionally stain release to textile substrates. Many such treating agents are fluorinated polymers and copolymers, or non-fluorinated polymers and copolymers. Non-fluorinated compounds are predominately polyacrylate-based or urethane-based copolymers.

Fluorinated copolymers provide good repellency to water and oil. Various attempts have been made to produce a non-fluorinated water or low-fluorine content repellent. Non-fluorinated copolymers are known to provide water repellency and optionally stain release to textiles, but are less effective than the fluorinated counterparts.

Typically relatively high levels of fluorinated monomers are required for adequate performance. For instance, U.S. Pat. No. 6,479,605 discloses formulations that have about 40 to about 75 weight % of fluorinated monomer in useful formulations. Furthermore, to achieve effective repellency the monomers typically used in commercial formulations have long perfluorinated alkyl groups, usually mixtures, with a large fraction of the perfluorinated alkyl groups greater than six carbon atoms. It is desired to have treating agents for fibrous substrates containing less fluorine while maintaining repellency performance. Lee et al, in U.S. Pat. No. 6,790,898, discloses an emulsion particle with a core-shell structure wherein the shell contained many perfluorinated groups and the core contained few or no perfluorinated groups. In this core-shell structure, the hydrophobic shell was designed to provide high levels of hydrophobic functionality at the air-material interface. However, the compositions were designed to provide polymer films, and not surface treatment agents for fibrous products.

SUMMARY OF INVENTION

The need exists for compositions having low fluorine content that provide water repellency and optionally stain release for textiles, with performance results comparable to treating agents with higher fluorine content. Also desirable is a non-fluorinated or partially fluorinated composition that can be bio-based derived. The present invention meets these needs.

The present invention comprises polymer compositions useful for imparting durable water repellency and optionally stain release to textiles, where at least one polymer is derived from sugar alcohols. These non-fluorinated or partially fluorinated polymer compositions provide increased durable water repellency and optionally stain release to textiles and are comparable to several water repellent compounds with higher fluorine content.

The present invention relates to a polymer composition comprising (A) a first polymer selected from a poly(meth)acrylate polymer or a urethane polymer; and (B) a second polymer selected from a urethane polymer comprising linkages of Formula I:

or a poly(meth)acrylate polymer comprising repeat units of Formula (II):

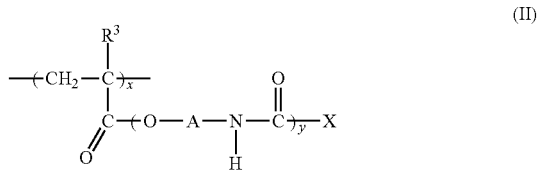

wherein Q is the residue of an isocyanate, diisocyanate, or polyisocyanate; X is the residue of a cyclic or acyclic sugar alcohol which is substituted with at least one —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof; $R^3$ is selected from H or a $C_1$ to $C_4$ alkyl group; A is a linear or branched $C_1$ to $C_{10}$ alkylene group; x is an integer from 1 to 200; and y is 0 or 1.

In a second embodiment, the invention relates to a method of making a polymer composition comprising contacting (A) a first polymer selected from a poly(meth)acrylate polymer or a urethane polymer; and (B) a second polymer selected from a urethane polymer comprising linkages of Formula (I) or a poly(meth)acrylate polymer comprising repeat units of Formula (II) wherein Q is the residue of an isocyanate, diisocyanate, or polyisocyanate; X is the residue of a cyclic or acyclic sugar alcohol which is substituted with at least one —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof; $R^3$ is selected from H or a $C_1$ to $C_4$ alkyl group; A is a linear or branched $C_1$ to $C_{10}$ alkylene group; x is an integer from 1 to 200; and y is 0 or 1.

In a third embodiment, the invention is a method of treating a fibrous substrate comprising applying to the surface of the substrate polymer composition comprising (A) a first polymer selected from a poly(meth)acrylate polymer or a urethane polymer; and (B) a second polymer selected from a urethane polymer comprising linkages of Formula (I) or a poly(meth)acrylate polymer comprising repeat units of Formula (II) wherein Q is the residue of an isocyanate, diisocyanate, or polyisocyanate; X is the residue of a cyclic or acyclic sugar alcohol which is substituted with at least one —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof; $R^3$ is selected from H or a $C_1$ to $C_4$ alkyl group; A is a linear or branched $C_1$ to $C_{10}$ alkylene group; x is an integer from 1 to 200; and y is 0 or 1.

DETAILED DESCRIPTION OF INVENTION

Herein all trademarks are designated with capital letters.

The present invention relates to a polymer composition comprising (A) a first polymer selected from a poly(meth)acrylate polymer or a urethane polymer; and (B) a second polymer selected from a urethane polymer comprising linkages of Formula I:

-Q-NHC(O)—X                (I)

or a poly(meth)acrylate polymer comprising repeat units of Formula (II):

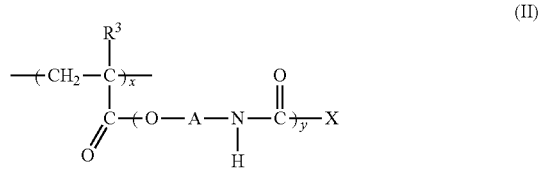

wherein Q is the residue of an isocyanate, diisocyanate, or polyisocyanate; X is the residue of a cyclic or acyclic sugar alcohol which is substituted with at least one —$R^1$; —C(O)$R^1$; —$(CH_2CH_2O)_n(CH(CH_3)CH_2O)_mR^2$; —$(CH_2CH_2O)_n(CH(CH_3)CHO)_mC(O)R^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof; $R^3$ is selected from H or a $C_1$ to $C_4$ alkyl group; A is a linear or branched $C_1$ to $C_{10}$ alkylene group; x is an integer from 1 to 200; and y is 0 or 1. The polymers may be homopolymers or copolymers, the repeat units and linkages of the polymers may be situated in any order to form random copolymers, block copolymers, or other configurations, and the polymer compounds may also include additional repeat units or linkages in any order.

The term "polymer" as used herein includes homopolymer compositions but also includes copolymers having 2 or more monomers. The term "residue of a cyclic or acyclic sugar alcohol" is herein defined as the molecular structure of a cyclic or acyclic sugar alcohol when one or more H atoms has been removed from a hydroxyl group —OH. In Formula (I) or in Formula (II) where y is 1, the bond of X to —NHC(O)— forms a urethane functional group. In Formula (II), where y is 0, the bond of X to C(O) forms an ester functional group. The term "residue of a diisocyanate or polyisocyanate" is herein defined as the molecular structure of a diisocyanate or polyisocyanate when all —NCO groups have been removed. The —NCO groups from the isocyanate compound form urethane linkages to the polymer backbone of Formula (I); form urethane, urea, or thiourea crosslinks; or bond to an optional blocking group. The urethane functional group may be formed by any suitable method, including by reacting an isocyanate, diisocyanate, or polyisocyanate with a cyclic or acyclic sugar alcohol which is substituted with at least one —$R^1$; —C(O)$R^1$; —$(CH_2CH_2O)_n(CH(CH_3)CH_2O)_mR^2$; —$(CH_2CH_2O)_n(CH(CH_3)CHO)_mC(O)R^1$; or mixtures thereof. The ester functional group may be formed by any suitable method, including by esterification of a (meth)acrylic acid with a cyclic or acyclic sugar alcohol which is substituted with at least one —$R^1$; —C(O)$R^1$; —$(CH_2CH_2O)_n(CH(CH_3)CH_2O)_mR^2$; —$(CH_2CH_2O)_n(CH(CH_3)CHO)_mC(O)R^1$; or mixtures thereof.

In a second embodiment, the invention relates to a method of making a polymer composition comprising contacting (A) a first polymer selected from a poly(meth)acrylate polymer or a urethane polymer; and (B) a second polymer selected from a urethane polymer comprising linkages of Formula (I) or a poly(meth)acrylate polymer comprising repeat units of Formula (II) wherein Formulas (I) and (II) are defined as above. The polymers may be contacted by any suitable method, including but not limited to blending the polymers together by mixing, reacting the formed polymers together by incorporating reactive functional groups into one of both polymers, or reacting the monomers of one polymer in the presence of the other pre-formed polymer. In one embodiment, the first polymer (A) and second polymer (B) are contacted by first i) preparing the second polymer (B), and subsequently ii) reacting at least one (meth)acrylic monomer of the first polymer (A) in the presence of polymer (B). In one embodiment, the first polymer (A) is chemically bonded to the second polymer (B). The polymer composition may be in the form of, for example, a polymer blend or a core-shell polymer composition. In one aspect, only one of the first or second polymers contains structures of Formulas (I) or (II). In another embodiment, both the first and second polymers contain at least one structure of Formulas (I) or (II).

In one aspect, one or more of the first or second polymers contains fluoroalkyl functional groups. In this case, the fluorinated monomer composes 30 to 70 mol % of the sum of isocyanate-reactive monomers in a urethane polymer, or the fluorinated monomer composes 30 to 70 mol % of the total monomer composition in a poly(meth)acrylate polymer. In another embodiment, the fluorinated monomer composes 40 to 60 mol % of the sum of isocyanate-reactive monomers in a urethane polymer, or the fluorinated monomer composes 40 to 60 mol % of the total monomer composition in a poly(meth)acrylate polymer. In one aspect, a non-fluorinated polymer may comprise 20 to 100 mol % of structures of Formula (I) or (II). In another aspect, a non-fluorinated polymer may comprise 40 to 100 mol % of structures of Formula (I) or (II), and in a further aspect, a non-fluorinated polymer may comprise 40 to 70 mol % of structures of Formula (I) or (II).

In a core-shell structure, the shell polymer can completely surround the core polymer, or alternatively the shell polymer can partially surround the core polymer. The term "core-shell" as used herein includes both of these alternatives. Where the polymer composition is a core-shell composition, the shell may be chemically bonded to the core, for example, by incorporating reactive functional groups into one or both of the core or shell compositions. For example, a urethane core or shell may incorporate an ethylenically unsaturated group into the polymer to react with poly(meth)acrylate monomers or polymer. Alternatively, the shell may be formed by reacting monomers, such as ethylenically unsaturated monomers, in the presence of an unreactive pre-formed core polymer. The core may be either urethane polymer or poly(meth)acrylate, may be reactive or unreactive, may be the first or second polymer, and may be non-fluorinated or fluorinated. The shell may be either urethane polymer or poly(meth)acrylate, may be reactive or unreactive, may be the first or second polymer, and may be non-fluorinated or fluorinated. Where the shell is a urethane polymer, the core and shell are chemically bonded, and the core is a poly (meth)acrylate polymer. Where at least one polymer is fluorinated, it is desirable but not necessary to have the fluorinated polymer on the outside of the structure. This maximizes contact of the shell polymer with a substrate to be treated and can aid in maximizing the surface effects imparted to the substrate. Optionally, one or more additional polymer layers may be incorporated into the core-shell structure, such as an intermediate poly(meth)acrylate polymer layer. In one embodiment of a core-shell structure, the core polymer composes from about 50% to about 70% by weight of the total polymer composition on a solids basis. In another aspect, the core polymer composes from about 55% to about 65% of the total polymer composition on a solids basis.

The second polymer (B) incorporates a substituted sugar alcohol into the polymer backbone. The cyclic or acyclic sugar alcohol is selected from a saccharide, reduced sugar, aminosaccharide, aldonic acid, or aldonic acid lactone, and is substituted with at least one —$R^1$; —$C(O)R^1$; —$(CH_2CH_2O)_n(CH(CH_3)CH_2O)_mR^2$; —$(CH_2CH_2O)_n(CH(CH_3)CH_2O)_mC(O)R^1$; or mixtures thereof. Such a substitution lends hydrophobic properties to the sugar alcohol. Examples of such sugar alcohols used to make the substituted sugar alcohols include but are not limited to aldoses and ketoses such as those compounds derived from tetroses, pentoses, hexoses, and heptoses. Specific examples include glucose, glyceraldehyde, erythrose, arabinose, ribose, arabinose, allose, altrose, mannose, xylose, lyxose, gulose, galactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof.

The cyclic or acyclic sugar alcohols are substituted with at least one —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$ by any suitable method, including esterification with a fatty acid, to form hydroxy-functional substituted sugar alcohols. In one aspect, the cyclic or acyclic sugar alcohols are substituted with at least two —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$, and in another aspect, the cyclic or acyclic sugar alcohols are substituted with at least three —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$. In one embodiment, the fatty acid substitution of the cyclic or acyclic sugar alcohols has a melting point of at least −59° C. In another embodiment, the fatty acid substitution of the cyclic or acyclic sugar alcohols has a melting point of at least 0° C., and in a third embodiment, the fatty acid substitution of the cyclic or acyclic sugar alcohols has a melting point of at least 40° C. Suitable fatty acids include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, and mixtures thereof. In one embodiment, $R^1$ is a linear or branched alkyl group having 7 to 29 carbons, in another embodiment, $R^1$ is a linear or branched alkyl group having 11 to 29 atoms, and in a third embodiment, $R^1$ is a linear or branched alkyl group having 17 to 21 carbons. In one embodiment, $R^2$ is a linear or branched alkyl group having 12 to 30 carbons, in another embodiment, $R^2$ is a linear or branched alkyl group having 18 to 30 carbons, and in another embodiment, $R^2$ is a linear or branched alkyl group having 18 to 22 carbons.

In one embodiment, X is selected from Formulas (IIIa), (IIIb), or (IIIc):

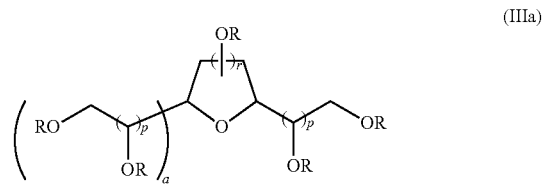

(IIIa)

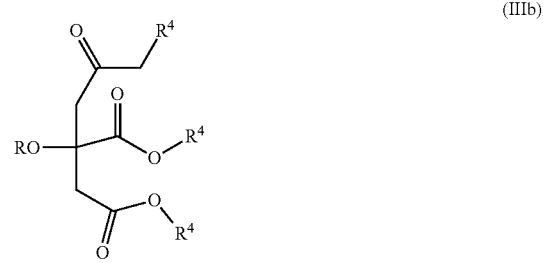

(IIIb)

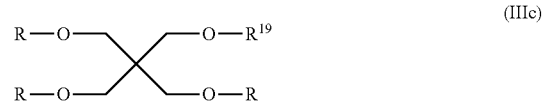

(IIIc)

wherein each R is independently a direct bond to C(O) of Formula I or Formula II; —H; —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$; each n is independently 0 to 20; each m is independently 0 to 20; m+n is greater than 0; r is 1 to 3; a is 0 or 1; p is independently 0 to 2; provided that a is 0 when r is 3; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond;

or mixtures thereof, provided when X is Formula (IIIa), then at least one R is a direct bond to C(O) of Formula I or Formula II; and at least one R is —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$; each $R^4$ is independently a direct bond to C(O) of Formula I or Formula II, —H, a linear or branched alkyl group having 6 to 30 carbons optionally comprising at least 1 unsaturated bond, or combinations thereof, —$(CH_2CH_2O)_n(CH(CH_3)CH_2O)_mR^2$, or —$(CH_2CH_2O)_n(CH(CH_3)CH_2O)_mC(O)R^1$; provided when X is Formula (IIb), then at least one R or $R^4$ is a direct bond to C(O) of Formula I or Formula II; and at least one R or $R^4$ is a linear or branched alkyl group optionally comprising at least 1 unsaturated bond, or combinations thereof; —(CH$_2$CH$_2$O)$_n$(CH(CH$_3$)CH$_2$O)$_m$R$^2$, or —(CH$_2$CH$_2$O)$_n$(CH(CH$_3$)CH$_2$O)$_m$C(O)R$^1$; and each R$^{19}$ is a direct bond to C(O) of Formula I or Formula II, —H, —C(O)R$^1$, or —CH$_2$C[CH$_2$OR]3, provided when X is Formula (IIc), then at least one R$^{19}$ or R is a direct bond to C(O) of Formula I or Formula II; and at least one R$^{19}$ or R is —C(O)R$^1$, —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$. In Formulas (IIIa), (IIIb), or (IIIc), the —(CH$_2$CH$_2$O)— represents oxyethylene groups (EO) and —(CH(CH$_3$)CH$_2$O)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

Where X is Formula (IIIa), any suitable substituted reduced sugar alcohol may be employed, including esters of 1,4-sorbitan, esters of 2,5-sorbitan, and esters of 3,6-sorbitan. In one embodiment, X is selected from Formula (IIIa) to be Formula (IIIa'):

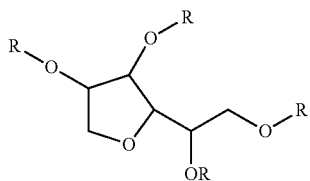

(IIIa')

wherein R is further limited to independently a direct bond to C(O) of Formula (I) or Formula (II), —H; —R$^1$; or —C(O)R$^1$. In this case, at least one R is —C(O)R$^1$ or R$^1$. Compounds used to form residues of Formula (IIIa'), having at least hydroxyl group OH and at least one R selected from —C(O)R$^1$, are commonly known as alkyl sorbitans. These sorbitans can be mono-substituted, di-substituted, or tri-substituted with —C(O)R$^1$. It is known that commercially available sorbitans, such as SPAN, contain a mixture of the various sorbitans ranging from where each R is H (unsubstituted), and sorbitans where each R is —C(O)R$^1$ (fully substituted); wherein R$^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least one R is —C(O)R$^1$, and R$^1$ is a linear branched alkyl group having 5 to 29 carbons. In another embodiment, R$^1$ is a linear or branched alkyl group having 7 to 21 carbons, and in a third embodiment, R$^1$ is a linear or branched alkyl group having 11 to 21 carbons. Preferred compounds used to form these residues include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds used to form X include mono-, di-, and tri-substituted sorbitan stearates or sorbitan behenins.

Optionally, R$^1$ is a linear or branched alkyl group having 5 to 29 carbons comprising at least 1 unsaturated bond. Examples of compounds used to form residues of Formula (IIIa') wherein at least one R is selected from —C(O)R$^1$, and R$^1$ contains least 1 unsaturated bond, include, but are not limited to, sorbitan trioleate (i.e., wherein R$^1$ is —C$_7$H$_{14}$CH=CHC$_8$H$_{17}$). Other examples include but are not limited to mono-, di-, and tri-substituted sorbitans derived from palmitoleic acid, lineolic acid, arachidonic acid, and erucic acid.

In one embodiment, X of Formula (IIIa') is employed, wherein R is further limited to independently a direct bond to C(O) of Formulas (I) or (II), —H, —(CH$_2$CH$_2$O)$_n$(CH(CH$_3$)CH$_2$O)$_m$R$^2$, or —(CH$_2$CH$_2$O)$_n$(CH(CH$_3$)CH$_2$O)$_m$C(O)R$^1$. In this embodiment, at least one R is independently —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$. Compounds forming X of Formula (IIIa'), wherein at least one R is —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups R$^1$ or R$^2$. It is known that commercially available polysorbates, contain a mixture of the various polysorbates ranging from where each R$^2$ is H (unsubstituted), and polysorbates where each R$^1$ is a linear or branched alkyl group having 5 to 29 carbons (fully substituted); and mixtures of various substitutions thereof. Examples of compounds used to form X of Formula (IIIa') include polysorbates such as polysorbate tristearate, and polysorbate monostearate. Examples of compounds used to form X of Formula (IIIa') wherein m+n is greater than 0, and wherein R$^1$ comprises at least 1 unsaturated bond, include but are not limited to, polysorbate trioleate (wherein R$^1$ is C$_7$H$_{14}$CH=CHC$_8$H$_{17}$), are sold commercially under the name Polysorbate 80. Reagents may include mixtures of compounds having various values for R, R$^1$, and R$^2$, and may also include mixtures of compounds where R$^1$ comprises at least one unsaturated bond with compounds where R$^1$ is fully saturated. In one aspect, R$^2$ is H and m is a positive integer.

In one embodiment, X is selected from Formula (IIIb). Compounds used to form X of Formula (IIIb) are known as alkyl citrates. These citrates can be present as a mono-substituted, di-substituted, or tri-substituted compound with alkyl groups. It is known that commercially available citrates contain a mixture of the various citrates as well as citric acids from where R and each R$^4$ is —H, ranging to citrates where each R$^4$ is a linear or branched alkyl group having 6 to 30 carbons optionally comprising at least 1 unsaturated bond; and mixtures of various substitutions thereof. Mixtures of citrates having various values for R$^1$, R$^2$, and R$^4$ may be used, and may also include mixtures of compounds where R$^1$ comprises at least one unsaturated bond with compounds where R$^1$ is fully saturated. Alkyl citrates are also commercially available wherein m+n is greater than 0, R$^4$ is —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$ and are present in the various substitutions from wherein R and each R$^2$ is H to wherein each R$^1$ and/or R$^2$ is a linear or branched alkyl group having 5 to 30 carbons optionally comprising at least 1 unsaturated bond. Examples of compounds used to form X of Formula (IIIb) include, but are not limited to, trialkyl citrates.

In one embodiment, X is selected from Formula (IIIc). Compounds used to form X of Formula (IIIc) are known as pentaerythriol esters. These pentaerythriol esters can be present as a mono-substituted, di-substituted, or tri-substituted with alkyl groups. Preferred compounds used to form X of Formula (IIIc) are dipentaerythriol esters, where R$^{19}$ is —CH$_2$C[CH$_2$OR]3. It is known that commercially available pentaerythriol esters contain a mixture of the various pentaerythriol esters where R$^{19}$ and each R is —H, ranging to pentaerythriol esters where each R is —C(O)R¹, and R¹ is a linear or branched alkyl group having 5 to 29 carbons optionally comprising at least 1 unsaturated bond; and mixtures of various substitutions thereof. The pentaerythriol esters also may contain compounds with mixtures of different chain lengths for R, or mixtures of compounds where R¹ comprises at least one unsaturated bond with compounds where R¹ is fully saturated.

Residue X can be bio-based derived. By "bio-based derived", it is meant that at least 10% of the material can be produced from non-crude oil sources, such as plants, other vegetation, and tallow. In one embodiment, X is from about 10% to 100% bio-based derived. In one embodiment, X is from about 35% to 100% bio-based derived. In another embodiment, X is from about 50% to 100% bio-based derived. In one embodiment, X is from about 75% to 100% bio-based derived. In one embodiment, X is 100% bio-based derived. The average OH value of the substituted sugar alcohol compounds used to form X can range from just greater than 0 to about 230. In one embodiment, the average OH value is from about 10 to about 175, and in another embodiment, the average OH value is from about 25 to about 140.

In one embodiment, the second polymer is a poly(meth) acrylate polymer. Such a polymer, having repeat units of Formula (II), is formed by the polymerization of a (meth) acrylic monomer having a residue X. Such a monomer may be formed by any suitable method, including by reacting an ethylenically unsaturated monomer having a carboxylic acid, acyl halide, amide, isocyanate, diisocyanate, or polyisocyanate functional group with a cyclic or acyclic sugar alcohol which is substituted with at least one —R¹; —C(O)R¹; —(CH$_2$CH$_2$O)$_n$(CH(CH$_3$)CH$_2$O)$_m$R²; —(CH$_2$CH$_2$O)$_n$(CH(CH$_3$)CHO)$_m$C(O)R¹; or mixtures thereof. For example, a compound selected from Formula (V)

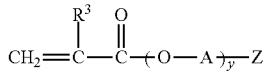

(V)

can be reacted with at least one cyclic or acyclic sugar alcohol which is substituted with at least one —R¹, —C(O)R¹, —(CH$_2$CH$_2$O)$_n$(CH(CH$_3$)CH$_2$O)$_m$R², —(CH$_2$CH$_2$O)$_n$(CH(CH$_3$)CH$_2$O)$_m$C(O)R¹, or mixtures thereof; where R¹, R², m, n, A, R³, and y are defined as above, and Z is selected from a halide, —OC(O)CR³=CH$_2$, —OH, or —NH$_2$ when y is 0 and Z is —NCO when y is 1.

Where y is 0, the substituted sugar alcohol compound may be combined with triethylamine in solvent, followed by a gradual addition of acryloyl chloride or methacryloyl chloride. The solid is removed, typically by filtration, and washed with organic solvent, and then purified, usually by extraction and water-washing, concentrating and drying under vacuum. In another method, compounds of the invention can be prepared from the substituted sugar alcohols by reacting with acrylic, methacrylic or chloroacrylic acid in the presence of an acid catalyst, such as toluenesulfonic acid, and a solvent, such as hexane, cyclohexane, heptane, octane, or toluene. The organic layer is washed with water, isolated, and then purified, typically by vacuum distillation. Optionally, inhibitors such as 4-methoxyphenol may be added during or after synthesis. Where y is 1, a substituted sugar alcohol compound may be reacted with a compound of Formula (V), where Z is —NCO. Any isocyanate compound fitting this formula may be used, and the inventive compound may be synthesized using conventional urethane synthesis techniques.

The poly(meth)acrylate polymer may be a homopolymer or may be a copolymer with one or more ethylenically unsaturated monomers. Where the polymer composition is a core-shell structure and the second polymer (B) is a poly (meth)acrylate polymer, the core-shell structure may be selected from a poly(meth)acrylate polymer (B) core and poly(meth)acrylate polymer (A) shell, a poly(meth)acrylate polymer (B) core and urethane polymer (A) shell, or a urethane (A) core and poly(meth)acrylate polymer (B) shell.

In one embodiment, the second polymer is a copolymer that comprises at least one additional repeat unit from an ethylenically unsaturated monomer having a functional group selected from a linear or branched hydrocarbon, linear or branched fluorocarbon, ether, alcohol, anhydride, oxyalkylene, ester, formate, carboxylic acid, carbamate, urea, amine, amide, sulfonate, sulfonic acid, sulfonamide, halide, saturated or unsaturated cyclic hydrocarbon, morpholine, pyrrolidine, piperidine, or mixtures thereof. The ethylenically unsaturated monomer can be any monomer having an ethylenically unsaturated bond with a functional group described above, including but not limited to linear or branched alkyl (meth)acrylates, amino and diamino (meth) acrylates, linear or branched fluoroalkyl (meth)acrylates optionally interrupted by O, CH$_2$, CH$_2$CH$_2$, or SO$_2$NH, alkoxylated (meth)acrylates, (meth)acrylic acid, vinyl or vinylidene chloride, glycidyl (meth)acrylate, vinyl acetate, hydroxyalkylene (meth)acrylate, urethane or urea (meth) acrylates, (meth)acrylamides including N-methyloyl (meth) acrylamide, alkoxyalkyl (meth)acrylamide, styrene, alpha-methylstyrene, chloromethyl-substituted styrene, ethylenediol di(meth)acrylate, 2-acrylamido-2-methyl-1-propane sulfonic acid (AMPS), and maleic anhydride. Suitable monomers include those listed above but also include other ethylenically unsaturated monomers that have been shown useful in hydrophobic polymers for fibrous substrates.

In one aspect, the first polymer (A) is a poly(meth) acrylate polymer. Such a polymer may be a homopolymer or copolymer of the ethylenically unsaturated monomers defined above, and may or may not include the monomer containing residue X.

Specific fluorinated ethylenically unsaturated monomers used to incorporate fluoroalkyl functionality into the first or second poly(meth)acrylate polymer include but are not limited to

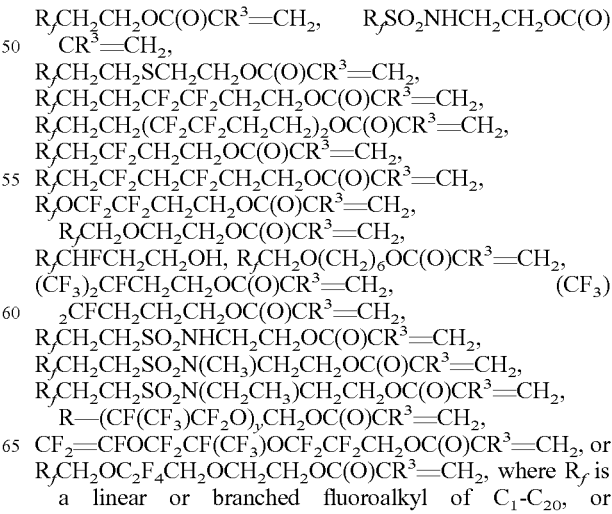

where $R_f$ is a linear or branched fluoroalkyl of $C_1$-$C_{20}$, or

CH₂=CH—COO—C₂H₄—N(CH₃)—SO₂—C₂H₄—C₆F₁₃, 2-[methyl[(3,3,4,4,5,5,6,6,6-nonfluorohexyl)sulfonyl]amino]ethyl acrylate, 2-[methyl[(3,3,4,4,5,5,6,6,7,7,8,8,8-tridecafluorooctyl)sulfonyl]amino]ethyl methacrylate, or 2-[[(3,3,4,4,5,5,6,6,7,7,8,8,8-tridecafluorooctyl)sulfonyl]amino]ethyl methacrylate. In one embodiment, $R_f$ is a $C_2$ to $C_6$ perfluoroalkyl.

In one embodiment, the second polymer (B) is a urethane polymer having a linkage of Formula (I). Such polymers are formed, for example, by reacting a substituted sugar alcohol with at least one isocyanate, diisocyanate, or polyisocyanate. In Formula (I), Q is the residue of an isocyanate, diisocyanate, or polyisocyanate and may be a monovalent, divalent, or polyvalent moiety selected from linear or branched, cyclic or acyclic, alkylene groups optionally containing at least one group selected from alkoxy, phenyl, siloxane, urethane, urea, biuret, uretdione, cyclized isocyanate, allophanate, or isocyanurate. Where multiple isocyanate groups are present, the isocyanate group-containing compound adds to the branched nature of the polymer. The term "polyisocyanate" is defined as di- and higher-functional isocyanates, and the term includes oligomers. Any monoisocyanate or polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. In this case, Q would be a linear $C_6$ alkylene having cyclized isocyanate groups. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers, where Q is a trivalent linear alkylene having an isocyanurate group. Preferred is DESMODUR N-100 (a hexamethylene diisocyanate-based compound available from Bayer Corporation, Pittsburgh, Pa.). Other triisocyanates useful for the purposes of this invention are those obtained by reacting three moles of toluene diisocyanate, where Q is a trivalent polyaromatic ring structure having a cyclized isocyanate group. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas:

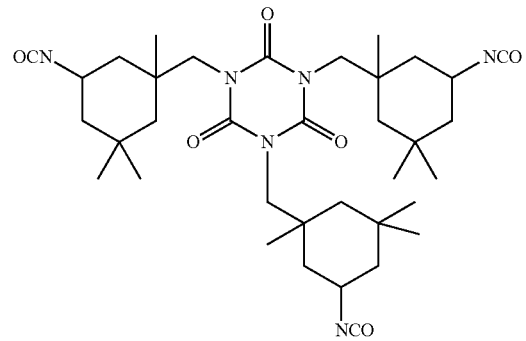
(VIa)

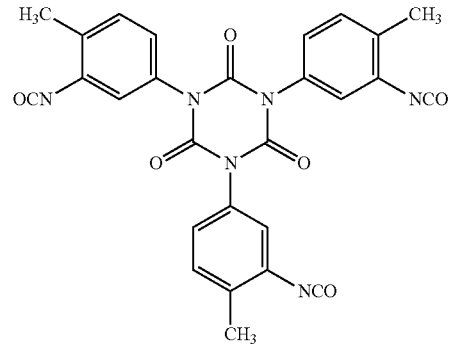
(VIb)

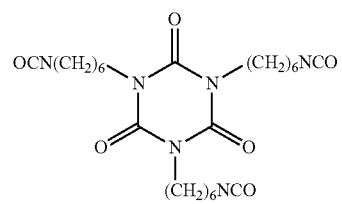
(VIc)

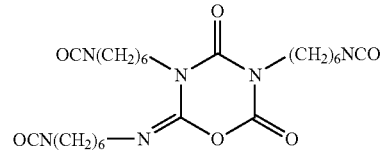
(VId)

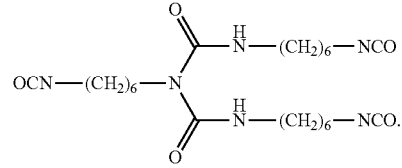
(VIe)

The diisocyanate trimers (VIa-e) are available, for instance as DESMODUR Z4470, DESMODUR IL, DESMODUR N-3300, DESMODUR XP2410, and DESMODUR N100, respectively, from Bayer Corporation. In one embodiment, Q is selected from Formulas (VIIa), (VIIb), (VIIc), (VIId), and (VIIe):

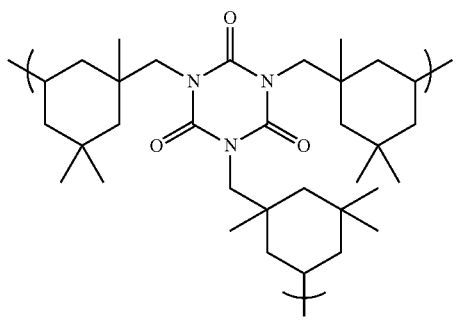
(VIIa)

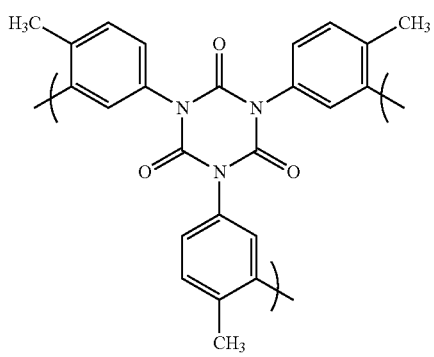
(VIIb)

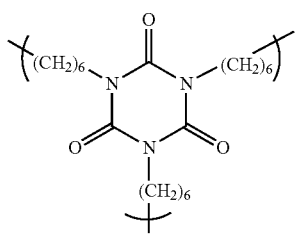
(VIIc)

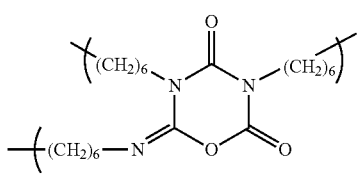
(VIId)

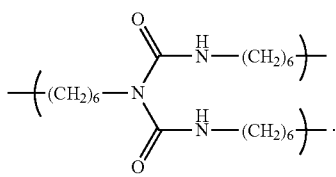
(VIIe)

In one embodiment, the urethane polymer (B) is a reaction product of a diisocyanate or polyisocyanate with a substituted sugar alcohol as defined above. In a different aspect, the urethane polymer (B) is a reaction product of an isocyanate, diisocyanate, or polyisocyanate; at least one substituted sugar alcohol; and at least one additional isocyanate-reactive component. Where the polymer composition has a core-shell structure, the composition is selected from a urethane polymer (B) core and poly(meth)acrylate polymer (A) shell or a poly(meth)acrylate polymer (A) core and urethane polymer (B) shell.

Where the urethane polymer (B) is the shell, it is chemically bonded to the polymer (A) core. Where the urethane polymer (B) is the core, it may or may not be chemically bonded to the poly(meth)acrylate polymer shell (A). Chemical bonding to polymer (A) can be achieved by, for example, incorporating an ethylenically unsaturated group into the urethane polymer by further reacting the isocyanate, diisocyanate, or polyisocyanate with an isocyanate-reactive monomer having an ethylenically unsaturated group. Examples of such compounds include but are not limited to hydroxyalkyl vinyl compounds, allylic or methallylic polyether alcohols, aminoalkyl vinyl compounds, acrylic or methacrylic alkyl alcohols, acrylic or methacrylic polyether alcohols, or acrylic or methacrylic amines.

In one embodiment, the urethane polymer (B) further comprises at least one linkage formed by reacting an isocyanate, diisocyanate, or polyisocyanate with a further isocyanate-reactive component. Where the additional isocyanate-reactive component is monovalent, it serves as a blocking group, and where the additional isocyanate-reactive component is polyvalent, it serves as a crosslinking compound. Such a linkage is selected from Formulas (IVa), (IVb), (IVc), or mixtures thereof:

$$R^6\text{-}D \quad \text{(IVa),}$$

$$R^{15}\text{—(OCH}_2\text{CH(OR}^{16}\text{)CH}_2)_z\text{—OR}^{17} \quad \text{(IVb)}$$

$$\text{—NH—C(O)—NH—X} \quad \text{(IVc)}$$

wherein D is selected from —N($R^{12}$)—C(O)—NH—, —OC(O)NH—, —C(O)NH—, —SC(O)NH—, —O—(CH$_2$CH$_2$O)$_s$(CH(CH$_3$)CH$_2$O)$_t$—C(O)NH—, or —[C(O)]—O—(CH$_2$CH$_2$O)$_s$(CH(CH$_3$)CH$_2$O)$_t$—C(O)NH—; X is defined as above; $R^6$ is selected from a —C$_1$ to C$_{30}$ linear or branched alkyl optionally comprising at least one unsaturated group, a C$_1$ to C$_{20}$ linear or branched fluoroalkyl optionally interrupted by O, CH$_2$, CH$_2$CH$_2$, or SO$_2$NH, a hydroxy- or urethane-functional C$_1$ to C$_{30}$ linear or branched alkyl, a hydroxy- or urethane-functional linear or branched C$_1$ to C$_{30}$ polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional C$_1$ to C$_{30}$ linear or branched alkyl, an amine- or urea-functional C$_1$ to C$_{30}$ linear or branched alkyl,

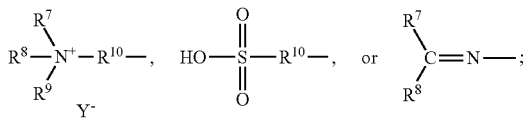

wherein $R^7$, $R^8$, and $R^9$ are each independently, —H, —C$_1$ to C$_6$ alkyl, or combinations thereof; $R^{10}$ is a divalent alkyl group of 1 to 20 carbons; $R^{12}$ is —H or a monovalent C$_1$ to C$_6$ alkyl group; $R^{15}$, $R^{16}$, and $R^{17}$ are each independently a —H; —C(O)NH—, —$R^{18}$; —C(O)$R^{18}$ provided that at least one $R^{15}$, $R^{16}$, or $R^{17}$ is a —C(O)NH—; $R^{18}$ is independently a linear or branched alkyl group having 5 to 29 carbons optionally comprising at least 1 unsaturated bond; z is 1 to 15; Y is Cl; s is an integer of 0 to 50; t is an integer of 0 to 50; and s+t is greater than 0. The further isocyanate-reactive component used to form the linkage is selected from water, organic compounds of Formula (VIIIa)

$$R^5\text{—V} \quad \text{(VIIIa), or}$$

organic compounds of Formula (VIIIb)

$$R^{11}\text{—(OCH}_2\text{CH(OR}^{11}\text{)CH}_2)_z\text{—OR}^{11} \quad \text{(VIIIb),}$$

or mixtures thereof, wherein $R^5$ is selected from a —$C_1$ to $C_{30}$ linear or branched alkyl optionally comprising at least one unsaturated group, a $C_1$ to $C_{20}$ linear or branched fluoroalkyl optionally interrupted by O, $CH_2$, $CH_2CH_2$, or $SO_2NH$, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy-functional linear or branched organosiloxane, an amine-functional linear or branched organosiloxane, a thiol-functional $C_1$ to $C_{30}$ linear or branched alkyl, an amine-functional $C_1$ to $C_{30}$ linear or branched alkyl,

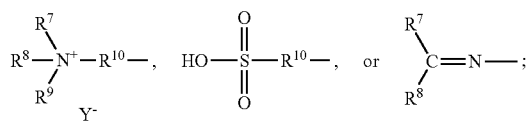

V is selected from —$N(R^{12})H$, —OH, —COOH, —SH, —O—$(CH_2CH_2O)_s(CH(CH_3)CH_2O)_t$—H, or (C(O)—O—$(CH_2CH_2O)_s(CH(CH_3)CH_2O)_t$H; $R^{11}$ is independently selected from —H; —$R^{18}$; or —$C(O)R^{18}$, provided that at least one $R^{11}$ is —H; z is defined as above; $R^{12}$ is defined as above; $R^{18}$ is defined as above; and s and t are defined as above. The term "branched", as used herein, means that the functional chain can be branched at any point, for example as a quarternary substituted carbon, and can contain any number of branched substitutions.

In one embodiment, the linkage of Formula (IVc) is present in the hydrophobic compound. Such a linkage is a urea functional group and can be formed from reacting water with active isocyanate groups in the compound. In a further embodiment, the linkage of Formula (IVa) is present, where D is —O—$(CH_2CH_2O)_s(CH(CH_3)CH_2O)_t$—C(O)NH—, or —[C(O)]—O—$(CH_2CH_2O)_s(CH(CH_3)CH_2O)_t$—C(O)NH—. Such a linkage may be formed by reacting a compound of Formula (VIIIa). Such a compound can be a hydrophilic water-solvatable material comprising at least one hydroxy-terminated polyether of Formula (VIIIa) wherein isocyanate-reactive group V is —O—$(CH_2CH_2O)_s(CH(CH_3)CH_2O)_t$—H or —[C(O)]—O—$(CH_2CH_2O)_s(CH(CH_3)CH_2O)_t$—H. In this embodiment, —$(CH_2CH_2O)$— represents oxyethylene groups (EO) and —$(CH(CH_3)CH_2O)$— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. In one aspect, the hydroxy-terminal polyethers of Formula (VIIIa) have an average molecular weight equal to or greater than about 200. In another aspect, the average molecular weight is between 350 and 2000.

In another embodiment, the linkage of Formula (IVa) is present, where D is —$N(R^{12})$—C(O)—NH—, —OC(O)NH—, —C(O)NH—, or —SC(O)NH—. Such a linkage may be formed from an organic compound of Formula (Via), where isocyanate-reactive group V is —OH, —C(O)OH, —SH, or —$NH(R^{12})$; and $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy- or amine-functional linear or branched organosiloxane, a thiol-functional $C_1$ to $C_{30}$ linear or branched alkyl, an amine-functional $C_1$ to $C_{30}$ linear or branched alkyl.

Where D is —OC(O)NH— or V is —OH, examples of Formula (VIIIa) include but are not limited to alkyl alcohols such as propanol, butanol, or fatty alcohols including stearyl alcohol ($R^5$ is a —$C_1$ to $C_{30}$ linear or branched alkyl optionally comprising at least one unsaturated group); alkyl diols or polyols such as ethanediol, propanediol, butanediol, or hexanediol ($R^5$ is a hydroxy-functional $C_1$ to $C_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units ($R^5$ is a hydroxy-functional linear or branched $C_1$ to $C_{30}$ polyether); polyester polyols ($R^5$ is a hydroxy-functional linear or branched polyester having a polyester polymer backbone); silicone prepolymer polyols ($R^5$ is a hydroxy-functional linear or branched organosiloxane); N,N-dimethylaminoethanol ($R^5$ is an amine-functional $C_1$ to $C_{30}$ linear or branched alkyl); choline chloride or betaine HCl ($R^5$ is $Y^-(R^7)(R^8)(R^9)N^+R^{10}$–); butanone oxime ($R^5$ is $(R^7)(R^8)C=N$—). The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). In one aspect, the polyether glycols have an average molecular weight equal to or greater than about 200. In another aspect, the average molecular weight is between 350 and 2000. Suitable fluorinated alcohols include but are not limited to $R_fCH_2CH_2OH$, $R_fSO_2NHCH_2CH_2OH$, $R_fCH_2CH_2SCH_2CH_2OH$, $R_fCH_2CH_2CF_2CF_2CH_2CH_2OH$, $R_fCH_2CH_2(CF_2CF_2CH_2CH_2)_2OH$, $R_fCH_2CF_2CH_2CH_2OH$, $R_fCH_2CF_2CH_2CF_2CH_2CH_2OH$, $R_fOCF_2CF_2CH_2CH_2OH$, $R_fCH_2OCH_2CH_2OH$, $R_fCHFCH_2CH_2OH$, $R_fCH_2O(CH_2)_6OH$, $(CF_3)_2CFCH_2CH_2OH$, $(CF_3)_2CFCH_2CH_2CH_2OH$, $R_fCH_2CH_2SO_2NHCH_2CH_2OH$, $R_fCH_2CH_2SO_2N(CH_3)CH_2CH_2OH$, $R_fCH_2CH_2SO_2N(CH_2CH_3)CH_2CH_2OH$, R—$(CF(CF_3)CF_2O)_yCH_2OH$, $CF_2=CFOCF_2CF(CF_3)OCF_2CF_2CH_2OH$, or $R_fCH_2OC_2F_4CH_2OCH_2CH_2OH$, where $R_f$ is a perfluoroalkyl of 01-020.

Where D is —C(O)NH— or V is —COOH, examples of Formula (VIIIa) include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid ($R^5$ is a —$C_1$ to $C_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid ($R^5$ is a hydroxy-functional $C_1$ to $C_{30}$ linear or branched alkyl); and mercaptoalkanoic acids such as mercaptopropionic acid ($R^5$ is a thiol-functional $C_1$ to $C_{30}$ linear or branched alkyl).

Where D is —SC(O)NH— or V is —SH, specific examples of Formula (VIIIa) include but are not limited to alkyl thiols such as lauryl mercaptan or dodecyl mercaptan ($R^5$ is a —$C_1$ to $C_{30}$ linear or branched alkyl optionally comprising at least one unsaturated group). Where D is —$N(R^{12})$—C(O)—NH— or V is —$NH(R^{12})$, specific examples of Formula (VIIIa) include but are not limited to alkyl amines such as diisopropylamine, propylamine, hexylmine, or laurylamine ($R^5$ is a —$C_1$ to $C_{30}$ linear or branched alkyl optionally comprising at least one unsaturated group); alkanolamines such as ethanolamine or propanolamine ($R^5$ is a hydroxy-functional $C_1$ to $C_{30}$ linear or branched alkyl); silicone prepolymer polyamines ($R^5$ is a amine-functional linear or branched organosiloxane); alkyl diamines ($R^5$ is an amine-functional $C_1$ to $C_{30}$ linear or branched alkyl); and aminoalkanesulfonic acids such as 2-aminoethanesulfonic acid ($R^5$ is HO—$S(O)_2R^{10}$—).

In a further embodiment, the urethane polymer comprises a linkage of Formula (IVb). Such linkages may be formed by the reaction of active isocyanate groups with a compound of Formula (VIb). These compounds are commonly referred to as polyglycerols. These polyglycerols can be present where $R^{15}$, $R^{16}$, and $R^{17}$ are independently a —H; —$R^{18}$; —C(O)$R^{18}$ provided that at least one of $R^{15}$, $R^{16}$, and $R^{17}$ is a —H; and wherein $R^{18}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono(carpylate/caprate), decaglyceryl di(carpylate/caprate), decaglycerol, polyglycerol-3, and $C_{18}$ diglyceride.

Where polymer (A) is a urethane polymer, it may be formed by reacting an isocyanate, diisocyanate, or polyisocyanate with one or more of any of the isocyanate-reactive monomers noted above, and may or may not include the substituted sugar alcohols.

Preferably, the urethane polymer (A) or (B) contains 0% to about 1% of reactive isocyanate groups. In one embodiment, the molecular weight of the hydrophobic compound is at least 10,000 g/mol. In one embodiment, the linkage of Formula (I) composes 30 to 100% by mol of the total urethane linkages in the hydrophobic compound. In one embodiment, the polymer compositions further comprise water to form an aqueous emulsion or aqueous dispersion. The polymers (A) or (B) may each individually form aqueous compositions such as aqueous emulsions or aqueous dispersions. The polymer compositions may further comprise a solvent selected from organic solvents.

The urethane polymers can be made in one step. If more than one isocyanate-reactive component is used, the polymers may be made in one step, or the reagents may be added sequentially. A sequential addition is especially useful when employing substituted sugar alcohols with high OH numbers, or when using polyfunctional isocyanate-reactive compounds. When a second compound is used selected from water, Formula (VIIIa), or Formula (VIIIb), molar concentrations of the at least one substituted sugar alcohol are such that there remains unreacted isocyanate groups to react with the one or more compounds selected from water, Formula (VIIIa), or Formula (VIIIb). This reaction is typically conducted by charging a reaction vessel with the isocyanate, diisocyanate, or polyisocyanate, and at least one substituted sugar alcohol, and optionally a second isocyanate-reactive compound. The order of reagent addition is not critical, but if water is used, the water should be added after the isocyanates and at least one substituted sugar alcohol are reacted.

The specific weight of the reactants charged is based on their equivalent weights and on the working capacity of the reaction vessel, and is adjusted so that substituted sugar alcohol will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound are added. In one embodiment, the mixture is allowed to react for several more hours or until all of the isocyanate has been reacted. Additional water can then be added along with surfactants, if desired, to the urethane compounds and stirred until thoroughly mixed. Following a homogenization or sonification step, the organic solvent can be removed by evaporation at reduced pressure, and the remaining aqueous solution or dispersion of the compound of the present invention can be used as is or subjected to further processing. The aqueous composition comprises at least one urethane compound of the present invention, a water carrier, and optionally one or more surfactants.

It will be apparent to one skilled in the art that many changes to any or all of the above procedures can also be used to optimize the reaction conditions for obtaining maximum yield, productivity, or product quality.

In another embodiment, the invention is a method of treating a fibrous substrate comprising applying to the surface of the substrate polymer composition comprising (A) a first polymer selected from a poly(meth)acrylate polymer or a urethane polymer; and (B) a second polymer selected from a urethane polymer comprising linkages of Formula (I) or a poly(meth)acrylate polymer comprising repeat units of Formula (II) wherein Q is the residue of an isocyanate, diisocyanate, or polyisocyanate; X is the residue of a cyclic or acyclic sugar alcohol which is substituted with at least one —$R^1$; —C(O)$R^1$; —$(CH_2CH_2O)_n(CH(CH_3)CH_2O)_mR^2$; —$(CH_2CH_2O)_n(CH(CH_3)CH_2O)_mC(O)R^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof; $R^3$ is selected from H or a $C_1$ to $C_4$ alkyl group; A is a linear or branched $C_1$ to $C_{10}$ alkylene group; x is an integer from 1 to 200; and y is 0 or 1.

The composition of the present invention as described above is contacted with the substrate by any suitable method. Such methods include, but are not limited to, application by exhaustion, foam, flex-nip, nip, pad, kiss-roll, beck, skein, winch, liquid injection, overflow flood, roll, brush, roller, spray, dipping, immersion, and the like. The composition is also contacted by use of a beck dyeing procedure, continuous dyeing procedure or thread-line application.

The composition of the present invention is applied to the substrate as such, or in combination with other optional textile finishes or surface treating agents. Such optional additional components include treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain release, soil repellency, soil release, water repellency, odor control, antimicrobial, sun protection, cleanability and similar effects. Such components may be fluorinated or non-fluorinated. One or more of such treating agents or finishes are applied to the substrate before, after, or simultaneously with the composition of the present invention. For example, for fibrous substrates, when synthetic or cotton fabrics are treated, use of a wetting agent can be desirable, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes are also optionally present, such as surfactants, pH adjusters, cross linkers, wetting agents, wax extenders, and other additives known by those skilled in the art. Suitable surfactants include anionic, cationic, nonionic, N-oxides and amphoteric surfactants. Examples of such additives include processing aids, foaming agents, lubricants, anti-stains, and the like. The composition is applied at a manufacturing facility, retailer location, or prior to installation and use, or at a consumer location.

Optionally, a blocked isocyanate is added with the composition of the present invention to further promote durability (i.e., as a blended composition). An example of a suitable blocked isocyanate to use in the present invention is PHOBOL XAN available from Huntsman Corp, Salt Lake City, Utah Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight are added.

The optimal treatment for a given substrate depends on (1) the characteristics of the compound or composition of the present invention, (2) the characteristics of the surface of the substrate, (3) the amount of compound or composition of the present invention applied to the surface, (4) the method of application of the compound or composition of the present invention onto the surface, and many other factors. Some compounds or compositions of the present invention work well on many different substrates and are repellent to water. Dispersions prepared from compounds of the present invention are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In another embodiment, the present invention is a fibrous substrate having applied to its surface a composition as disclosed above. The present invention further comprises substrates treated with a compound or composition of the present invention as described above. Suitable substrates include fibrous substrates. The fibrous substrates include fibers, yarns, fabrics, fabric blends, textiles, nonwovens, paper, leather, and carpets. These are made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. The nonwoven substrates include, for example, spunlaced nonwovens, such as SONTARA available from E. I. du Pont de Nemours and Company, Wilmington, Del., and spunbonded-meltblown-spunbonded nonwovens. The treated substrates of the present invention have excellent water repellency and optionally stain release properties. If fluorine is present, the treated substrate has a fluorine content of from about 0.05% by weight to about 0.5% by weight.

The compounds, compositions, method, and substrates of the present invention are useful to provide excellent water repellency and optionally stain release to treated substrates. The use of non-fluorinated or partially-fluorianted polymer compositions has been found to provide superior water repellency and durable water repellency compared to traditional non-fluorinated water repellents and are comparable to commercially available fluorinated water repellents. The treated substrates of the present invention are useful in a variety of applications and products such as clothing, protective garments, carpet, upholstery, furnishings, and other uses. The excellent surface properties described above help to maintain surface cleanliness and therefore can permit longer use.

TEST METHODS AND MATERIALS

All solvents and reagents, unless otherwise indicated, were purchased from Sigma-Aldrich, St. Louis, Mo., and used directly as supplied. MPEG 750 is defined as poly (ethylene glycol) methyl ether 750 and is commercially available from Sigma-Aldrich, St. Louis, Mo. TERGITOL TMN-10 is commercially available from Sigma-Aldrich, St. Louis, Mo. Methyl isobutyl ketone (MIBK) and polyoxyethylene-7-methacrylate (7-EO MA) are both commercially available from Sigma-Aldrich, St. Louis, Mo. TWEEN 20 and 21 are also available from Sigma-Aldrich.

Sorbitan tristearate is commercially available from Croda, East Yorkshire, England, or DuPont Nutrition & Health, Copenhagen, Denmark. Sorbitan tribehenin 40 and sorbitan tribehenin 88 was obtained from DuPont Nutrition & Health, Copenhagen, Denmark. Sorbitan trioleate was obtained from Croda, East Yorkshire, England.

2-Methyl-2-propenoic acid, 3,3,4,4,5,5,6,6,7,7,8,8,8-tridecafluorooctyl ester (62-FMA) is commercially available from DuPont Chemicals and Fluoroproducts, Wilmington, Del.

DESMODUR N-100 was obtained from Bayer Corporation, Pittsburgh, Pa.

BLEMMER PP-500 (a poly(propylene glycol) methacrylate), BLEMMER PE-350 (a poly(ethylene glycol) methacrylate), and behenyl methacrylate are available from NOF Corporation, Tokyo, Japan.

CHEMIDEX S is an alkanolamide surfactant, available from Lubrizol, Wickliffe, Ohio.

ETHAL LA-4 is a laureth-4 surfactant available from Ethox Chemicals, Buffalo, N.Y.

Silwax D226 and E1316, and TC11-58B are alkylated silicones obtained from Siltech Corporation, Toronto, Canada.

STEPOSOL SB-W is a soya methyl ester surfactant available from Stepan, Northfield, Ill.

ARMEEN DM-18D was obtained from Akzo-Nobel, Bridgewater, N.J.

The following test methods and materials were used in the examples herein.

Test Method 1—Water Drop

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of the test liquid.

TABLE 1

Standard Test Liquids

| Water Repellency Rating Number | Composition Vol. %, Isopropyl Alcohol | Composition, Vol. % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 2—Spray Rating

The dynamic water repellency of treated substrates was measured according to the American Association of Textile Chemists and Colorists (AATCC) TM-22. Samples are visually scored by reference to published standards, with a rating of 100 denoting no water penetration or surface adhesion. A rating of 90 denotes slight random sticking or wetting without penetration; lower values indicate progressively greater wetting and penetration. Test Method 2, the dynamic water repellency test, is a demanding and realistic test of water repellency.

Test Method 3—Oil Drop

The treated fabric samples were tested for oil repellency by a modification of AATCC standard Test Method No. 118, conducted as follows: A fabric sample, treated with an aqueous dispersion of polymer, was conditioned for a minimum of 15 hours at 23° C.+65% relative humidity prior to testing. A series of organic liquids, identified below in Table 2, were then applied drop wise to the fabric samples. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids resulted in two of the three drops failing to remain spherical to hemispherical, or wetting or wicking occurred.

The oil repellency rating of the fabric was the highest numbered test liquid for which two of the three drops remained spherical to hemispherical, with no wicking for 30 seconds. Ratings of 0.5 increments were determined by subtracting one-half from the number in Table 2 for borderline passing of the next liquid. Higher ratings indicate greater repellency. The composition of oil repellency test liquids is shown in the Table 2.

TABLE 2

Oil Repellency Test Liquids

| Oil Repellency Rating | Test Solution |
|---|---|
| 1 | NUJOL Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |

Test Method 4—Fabric Treatment

The fabrics treated in this study were 100% by weight khaki cotton twill available from SDL Atlas Textile Testing Solutions, Rock Hill, S.C. 29732, 100% by weight red polyester fabric available from L. Michael OY, Finland, or 100% by weight blue polyester fabric available from Toray Textiles, Mansfield, UK. Unless blue polyester is specified, the red polyester fabric was used. The fabric was treated with the aqueous dispersions various emulsion polymer using a conventional pad bath (dipping) process. The prepared concentrated dispersion of the polymer emulsions were diluted with deionized water to either 10% polymer solids (Examples 1-48), or to achieve a pad bath having 90 g/L (at 20% solids, Examples 49-59) or 45 g/L (at 25% solids, Example 60) of the final emulsion in the bath. For Examples 49-59, 10 g/L of PHOBOL XAN was also added to the pad bath.

Examples of the compositions of the instant invention can be made from various combinations of polymers. The present invention is not to be limited by the examples below.

Preparation of Wax 1

Into a 4-neck round bottom flask equipped with an overhead stirrer, thermocouple and condenser was added 60.1 g of SILWAX D226 and 150.1 g of 4-methyl-2-pentanone (MIBK). After the solution was heated to 65° C., an aqueous dispersion was prepared. Warm DI water (550.5 g), dipropylene glycol (14.7 g), CHEMIDEX S (1.3 g), ETHAL LA-4 (1.7 g) and acetic acid (0.9 g) were added to a beaker and stirred to form a surfactant solution. The solution was then added to the melted wax to create a milky solution. The mixture was emersion blended (2 minutes), homogenized at 6000 psi, and the resulting emulsion was distilled to yield a dispersion at 9.42% solids.

Preparation of Wax 2

The Preparation of Wax 1 was repeated, using 60.1 g of SILWAX E1316 instead of SILWAX D226, and using the following different amounts: water (464 g) and dipropylene glycol (14.8 g). All other amounts were the same. The final product was a dispersion at 12.19% solids.

Preparation of Core 1

A 4-neck round bottom flask equipped with an overhead stirrer, thermocouple, condenser, nitrogen inlet, and gas outlet. Sorbitan tristearate (518 g), sodium carbonate (3.2 g), and MIBK (858 g) were added to the flask. The solution was heated to 55° C. DESMODUR N100 (140 g) was added and the temperature was increased to 80° C. $FeCl_3$ catalyst solution (5.97 g, 0.5 weight % in MIBK) was added, and the reaction temperature was increased to 95° C. After 6 hours, n-butanol (8.2 g) and water (2.0 g) were added to the reaction mixture.

Water (1884 g), CHEMIDEX S (14.6 g), ETHAL LA-4 (21.7 g), dipropylene glycol (165.8 g), and acetic acid (10.7 g) were added to a beaker and stirred to form a homogeneous surfactant solution. The solution was heated to 65° C. and 9.6 g of mineral oil was added. The urethane reaction mixture was cooled to 65° C. and the surfactant solution was slowly added to produce a milky solution. The mixture was emersion blended by immersion blender (2 minutes) and homogenized at 6000 psi. MIBK was removed via rotary evaporation. An additional 6.6 g of CHEMIDEX S and 557 g of water was added to yield urethane dispersion. The product was cooled and filtered, with the resulting dispersion at 25.0% solids.

Preparation of Core 2

The Preparation of Core 1 was repeated, using sorbitan tristearate (445.6 g) sodium carbonate (2.8 g), MIBK (446 g), DESMODUR N100 (120 g), n-butanol (7.0 g), water (1.7 g) to form the urethane. SILWAX D226 (192.5 g) and MIBK (186.3 g) were added to the urethane reaction mixture when the reaction tested negative for active isocyanates.

The aqueous dispersion included water (2168 g), CHEMIDEX S (16.7 g), ETHAL LA-4 (24.9 g), dipropylene glycol (190.0 g), acetic acid (12.3 g), and mineral oil (11.0 g). An additional 7.1 g of CHEMIDEX S and 334 g of water was added to yield a non-flammable urethane dispersion at 26.47% solids after cooling and filtering.

Preparation of Core 3

Wax 2 (61.54 g) and Core 1 (90.12 g) were combined to yield a final solids content of 19.52%.

Preparation of Core 4

The Preparation of Core 1 was repeated, using sorbitan tristearate (192.8 g), sorbitan trioleate (236.3 g) sodium carbonate (2.5 g), MIBK (525.0 g), DESMODUR N100 (110 g), n-butanol (12.9 g), water (3.1 g) to form the urethane.

The aqueous dispersion included water (1750 g), CHEMIDEX S (12.4 g), ETHAL LA-4 (18.2 g), dipropylene glycol (140.1 g), acetic acid (8.7 g), and mineral oil (10.1 g). Additional MIBK (10.1 g) was also added. An additional 5.4 g of CHEMIDEX S and 89.0 g of DI water was added to yield a urethane dispersion at 25.00% solids after cooling and filtering.

Preparation of Core 5

A dry 4-neck 500 mL round bottom flask was assembled with a thermocouple, mechanical stirrer, nitrogen inlet, condenser, and gas outlet. The flask was charged with DESMODUR N100 (16.0 g), MIBK (135.3 g), and $FeCl_3$ solution (0.5 wt % in MIBK, 0.68 g). The reaction mixture was heated to 60° C. Sorbitan tribehenin 88 (74.2 g) and $Na_2CO_3$ (0.39 g) were added to the flask. The temperature was raised to 95° C., and the reaction stirred overnight. N-Butanol (0.93 g) was added to the flask, and the temperature was set to 80° C. When the reaction tested negative for active isocyanates, mineral oil (1.21 g) was added. Warm DI water (271.7 g), CHEMIDEX S (1.60 g), ETHAL LA-4 (2.38 g), acetic acid (1.2 g), and dipropylene glycol (18.2 g) were mixed into a plastic container and added to the flask. The mixture was stirred for 30 minutes at 75° C. Then the mixture was homogenized 4 passes at 6000 psi. MIBK was removed via distillation, and the product was filtered to yield a urethane dispersion at 22.73% solids.

Preparation of Core 6

A dry 4-neck 500 mL round bottom flask was assembled with a thermocouple, mechanical stirrer, nitrogen inlet, condenser, and gas outlet. The flask was charged with DESMODUR N100 (15.4 g), MIBK (108.1 g), and $FeCl_3$ solution (0.66 g, 0.5 wt % in MIBK). The reaction mixture was heated to 60° C., and MPEG 750 (6.1 g) and $Na_2CO_3$ (0.35 g) were added to the flask. The temperature was raised to 95° C. and stirred for 1 hour. Sorbitan tristearate (50.6 g) was added to the flask. The temperature was raised to 95° C., and the reaction stirred overnight. N-Butanol (0.93 g) was added to the flask, and the temperature was set to 80° C. When the reaction mixture tested negative for active isocyanates, minera oil (0.97 g) was added. Warm DI water (217.3 g), dipropylene glycol (17.8 g), Chemidex S (1.57 g), Ethal LA-4 (2.33 g), and acetic acid (1.15 g) were mixed in a separate container and added to the flask. The mixture was stirred for 30 minutes at 75° C. Then the mixture was homogenized for 4 passes at 6000 psi and MIBK was removed via rotary evaporation. The product was filtered through a sock filter and diluted to 25.0% solids Preparation of Core 7

A 4-neck round bottom flask equipped with an overhead stirrer, thermocouple, nitrogen inlet, condenser, and gas outlet. Sorbitan tristearate (198.8 g) sodium carbonate (1.4 g), polyoxyethylene-(7)-methacrylate (12.0 g) and MIBK (284 g) were added to the flask. The solution was heated to 55° C., DESMODUR N100 (60.0 g) was added, and the temperature was increased to 80° C. $FeCl_3$ catalyst solution (2.56 g, 0.5 weight % in MIBK) was added and the reaction temperature was increased to 95° C. After 6 hours, n-butanol (3.5 g) and water (0.9 g) were added to the reaction mixture. When the reaction mixture tested negative for active isocyanates, surfactant solution was prepared.

Warm DI water (769.9 g), CHEMIDEX S (6.0 g), ETHAL LA-4 (8.9 g), dipropylene glycol (68.1 g), and acetic acid (4.4 g) were added to a beaker and stirred to form a homogeneous surfactant solution. The solution was heated to 65° C. and 3.9 g of mineral oil was added. The urethane reaction was cooled to 65° C. and the surfactant solution was slowly added to produce a milky solution. The mixture was blended (2 minutes) and homogenized at 6000 psi. MIBK was removed via rotary evaporation. Additional CHEMIDEX S (2.3 g) and water (30.0 g) were added. The urethane dispersion was cooled and filtered, resulting in a final product at 24.96% solids.

Preparation of Core 8

Wax 1 (79.68 g) and Core 7 (90.16 g) were combined to yield a final solids content of 17.07%.

Preparation of Core 9

Wax 2 (61.53 g) and Core 7 (90.18 g) were combined to yield a final solids content of 20.24%.

Preparation of Core 10

The Preparation of Core 7 was repeated, using sorbitan tristearate (23.4 g), sorbitan trioleate (28.7 g), sodium carbonate (0.3 g), polyoxyethylene-(7)-methacrylate (3.0 g), MIBK (71.6 g), DESMODUR N100 (15.0 g), n-butanol (1.8 g), and water (0.4 g). The aqueous dispersion contained water (203.1 g), CHEMIDEX S (1.6 g), ETHAL LA-4 (2.3 g), dipropylene glycol (17.8 g), acetic acid (1.2 g), and mineral oil (1.0 g). No additional CHEMIDEX S or water was added. The final urethane dispersion had a solids content of 17.34%.

Preparation of Core 11

The Preparation of Core 7 was repeated, using sorbitan tribehenin 40 (48.3 g), sodium carbonate (0.3 g), polyoxyethylene-(7)-methacrylate (2.4 g), MIBK (57.3 g), DESMODUR N100 (12.0 g), n-butanol (0.7 g), and water (0.2 g). The aqueous dispersion contained water (172.4 g), CHEMIDEX S (1.3 g), ETHAL LA-4 (8.9 g), dipropylene glycol (15.0 g), acetic acid (1.0 g), and mineral oil (0.9 g). No additional CHEMIDEX S or water was added. The final urethane dispersion had a solids content of 16.77%.

Preparation of Core 12

A dry 4-neck 500 mL round bottom flask was set-up with thermocouple, mechanical stirrer, a nitrogen inlet, condenser, and gas outlet. The flask was charged with DESMODUR N100 (16.0 g), MIBK (110.4 g), and FeCl$_3$ solution (0.7 g, 0.5 weight % in MIBK). The reaction mixture was heated to 60° C. Sorbitan tristearate (52.6 g) and Na$_2$CO$_3$ (0.37 g) were added to the flask. The temperature was then raised to 95° C. and stirred for 4 hours. Reaction was cooled to 80° C. BLEMMER PP-500 (5.01 g) was added to the flask, and the reaction was stirred overnight. n-Butanol (0.62 g) and water (0.15 g) were added to the flask.

When the reaction tested negative for active isocyanates, mineral oil (0.99 g) was added. Warm DI water (222 g), Chemidex S (1.60 g), Ethal LA-4 (2.38 g), acetic acid (1.17 g), and dipropylene glycol (18.20 g) were mixed into a plastic container and added to the flask. The mixture was stirred for 30 minutes at 75° C. Then the mixture was homogenized 4 passes at 6000 psi. MIBK was removed via rotary evaporation. The product was filtered through a milk filter and diluted to 25.0% solids.

Preparation of Complex Core Monomer Dispersion (CCMD)

ARMEEN DM 18D (7.78 g), acetic acid (4.86 g), TERGITOL TMN-10 (3.89 g), dipropylene glycol (36.96 g), STEPOSOL SB-W (2.91 g), stearic acid (0.02 g), and hot deionized water (457.30 g) were combined in a glass beaker and stirred at 60° C. for 5-10 min. The resulting mixture was combined with behenyl methacrylate (168.85 g), 7-EOMA (4.00 g), hydroxyethyl methacrylate (16.16 g), and dodecyl mercaptan (3.31 g) in a plastic container and blended by immersion blender for 1-2 minutes. The blended pre-emulsion was immediately homogenized 5 passes at 4350 psi and charged into a flask. When the mixture cooled to 30° C., N-methylolacrylamide (48% by weight in water, 16.53 g) was added. The mixture was stirred for 10 minutes and blended using an immersion blender for 1-2 minutes.

Preparation of Cores 13-22

A 4-neck 500 or 250 mL round bottom flask was assembled with a thermocouple, mechanical stirrer, nitrogen inlet, condenser, and gas outlet. A simple core and CCMD (62.5 g) were added to the flask according to Table 3. The mixture was sparged with nitrogen for 10-20 minutes, VAZO 56 (0.3 g) initiator was added, and the reaction was heated to 55° C. and stirred overnight. The product was filtered through a milk filter.

TABLE 3

Complex Core Preparation

| Preparation of | Simple Core Used | Amount of Simple Core Used (g) |
|---|---|---|
| Core 13 | Core 1 | 75.00 |
| Core 14 | Core 2 | 70.62 |
| Core 15 | Core 3 | 96.06 |
| Core 16 | Core 4 | 75.00 |
| Core 17 | Core 6 | 75.00 |
| Core 18 | Core 7 | 75.12 |
| Core 19 | Core 8 | 109.84 |
| Core 20 | Core 9 | 92.64 |
| Core 21 | Core 10 | 108.13 |
| Core 22 | Core 12 | 75.00 |

Preparation of Core 23

A dry 4-neck 500 mL round bottom flask was set-up with thermocouple, mechanical stirrer, a nitrogen inlet, condenser, and gas outlet. The flask was charged with DESMODUR N100 (12.1 g), MIBK (84.8 g), and FeCl$_3$ solution (0.5% in MIBK, 0.5 g). The reaction mixture was heated to 60° C. Sorbitan tristearate (44.5 g) and Na$_2$CO$_3$ (0.55 g) were added to the flask. The temperature was then raised to 95° C. and stirred for 4 hours, at which point the reaction was cooled to 80° C. Hydroxyethyl methacrylate (0.41 g) was added to the flask, and the reaction was stirred overnight.

Preparation of Core 24

The Preparation of Core 23 was repeated, using DESMODUR N100 (14.0 g), MIBK (98.1 g), FeCl$_3$ solution (0.5% in MIBK, 0.58 g, sorbitan tristearate (51.4 g), and Na$_2$CO$_3$ (0.64 g). BLEMMER PE-350 (1.45 g) was added to the flask instead of hydroxyethyl methacrylate.

Preparation of Core 25

The Preparation of Core 23 was repeated, using DESMODUR N100 (15.0 g), MIBK (71.59 g), FeCl$_3$ solution (0.5% in MIBK, 0.32 g, sorbitan tristearate (54.75 g), and Na$_2$CO$_3$ (0.35 g). n-Butanol (0.87 g) and water (0.21 g) were added to the flask instead of hydroxyethyl methacrylate, and SILWAX D226 (23.66 g) was added to the reaction flask when the reaction tested negative for active isocyanates. Warm DI water (318.0 g), Ethal LA-4 (0.90 g), TWEEN 21 (4.0 g), TWEEN 20 (4.0 g), and dipropylene glycol (23.4 g) were mixed into a plastic container and added to the flask. The mixture was stirred for 30 minutes at 75° C. Then the mixture was homogenized for 2 passes at 6000 psi, and MIBK was removed via distillation. The product was filtered through a milk filter and diluted to 25.0% solids.

Preparation of Core 26

The Preparation of Core 1 was repeated, using DESMODUR N100 (15.0 g), MIBK (71.8 g), FeCl$_3$ solution (0.5% in MIBK, 0.32 g), sorbitan tristearate (54.8 g), Na$_2$CO$_3$ (0.4 g), n-butanol (0.9 g), and no water reagent. When the reaction tested negative for active isocyanates, 17.8 g of SILWAX D226 was added to the reaction. Warm DI water (213 g), CHEMIDEX S (2.0 g), ETHAL LA-4 (2.5 g), and dipropylene glycol (22.8 g) were used. An additional 0.5 g of CHEMIDEX S was added to yield a urethane dispersion at 32.97% solids after cooling and filtering. The dispersion was diluted to 20.0% solids.

Preparation of Core 27

A dry 4-neck 500 mL round bottom flask was set up with thermocouple, mechanical stirrer, a nitrogen inlet, condenser, and gas outlet. The flask was charged with DESMODUR N100 (14.0 g), MIBK (98.1 g), and $FeCl_3$ solution (0.5% by weight in MIBK, 0.58 g). The reaction mixture was heated to 60° C. Sorbitan tristearate (51.4 g) and $Na_2CO_3$ (0.64 g) were added to the flask. The temperature was then raised to 95° C. and stirred for 4 hours, at which point the reaction was cooled to 80° C. BLEMMER PE-350 (1.45 g) was added to the flask, and the reaction was stirred overnight.

Preparation of Shell 1

ARMEEN DM 18D (4.14 g), acetic acid (2.59 g), TERGITOL TMN-10 (2.07 g), dipropylene glycol (19.67 g), STEPOSOL SB-W (1.55 g), stearic acid (0.01 g), and hot DI water (257.65 g) were combined in a glass beaker and stirred at 60° C. for 5-10 min. The resulting mixture was combined with 6,2-FMA (86.12 g), behenyl methacrylate (21.11 g), 7-EOMA (0.50 g), hydroxyethyl methacrylate (2.02 g), and dodecyl mercaptan (0.41 g) in a plastic container and blended by immersion blender for 1-2 minutes. The blended pre-emulsion was immediately homogenized 8 passes at 4350 psi and charged into a flask. When the mixture cooled to 30° C., N-methylolacrylamide (48% by weight in water, 2.07 g) was added. The mixture was stirred for 10 minutes.

Preparation of Shell 2

The Preparation of Shell 1 was repeated, using ARMEEN DM 18D (5.09 g), acetic acid (3.18 g), TERGITOL TMN-10 (2.5 g), dipropylene glycol (24.18 g), STEPOSOL SB-W (1.91 g), stearic acid (0.01 g), hot DI water (310.75 g), 6,2-FMA (84.44 g), behenyl methacrylate (42.21 g), 7-EOMA (1.00 g), hydroxyethyl methacrylate (4.04 g), dodecyl mercaptan (0.83 g), and N-methylolacrylamide (4.13 g).

Preparation of Shell 3

De-ionized water (190.46 g), ARMEEN DM18D (3.92 g), and BRIJ 52 (2.09 g) were heated to 50° C. in a water bath. The heated ingredients were combined with 6,2-FMA (80 g), 7-EOMA (1.66 g), stearyl methacrylate (40 g), N-methylolacrylamide (48% by weight in water, 2.67 g), hydroxyethyl methacrylate (1.90 g), dodecyl mercaptan (0.62 g), and dipropylene glycol (25.64 g) in a plastic container, and the resulting mixture was statically mixed in a blender on low speed for 1 minutes and homogenized for 8 passes at 4350 psi. The pre-emulsion was charged into a 1 L, 4-neck flask with condenser, overhead stirring, and nitrogen sparge. Additional DI water was added (111 g). The warm pre-emulsion mixture was sparged with nitrogen to cool. When below 30° C., vinylidene chloride (13.3 g) was added and the pre-emulsion mixture was allowed to stir for 15 minutes.

Preparation of Shell 4

Hot DI water (320.00 g), ARMEEN DM 18D (7.64 g), acetic acid (4.77 g), TERGITOL TMN-10 (3.82 g), dipropylene glycol (36.27 g), Steposol SB-W (2.86 g), stearic acid (0.02 g), and SILTECH TC11-58B (14.15 g) were combined in a glass beaker and stirred at 60° C. for 5-10 minutes. The resulting mixture was combined with 6,2-FMA (126.65 g), benehyl methacrylate (63.32 g), 7-EO MA (1.50 g), hydroxyethyl methacrylate (6.06 g), and dodecyl mercaptan (1.24 g) in a plastic container and blended by immersion blender for 1-2 minutes. The blended pre-emulsion was immediately homogenized 8 passes at 4350 psi and cooled to 30° C.

Preparation of Shell 5

The Preparation of Shell 4 was repeated, without the use of SILTECH TC11-58B.

Preparation of Shell 6

Hot DI water (229.08 g), ARMEEN DM 18D (7.64 g), acetic acid (4.77 g), TERGITOL TMN-10 (3.82 g), dipropylene glycol (36.27 g), Steposol SB-W (2.86 g), and stearic acid (0.02 g) were combined in a glass beaker and stirred at 60° C. for 5-10 minutes. The resulting mixture was combined with 6,2-FMA (132.13 g), stearyl methacrylate (42.00 g), 7-EO MA (2.34 g), hydroxyethyl methacrylate (2.42 g), and dodecyl mercaptan (1.40 g) in a plastic container and blended by immersion blender for 1-2 minutes. The blended pre-emulsion was immediately homogenized 8 passes at 4350 psi and cooled to 30° C.

Comparative Example A

Untreated fabric samples were tested according to the test methods above. Both cotton and polyester fabrics had a water drop rating of 0, an oil drop rating of 0, and a spray rating of 0.

Examples 1-50

The core dispersion, shell emulsion, and initiator VAZO 56 (0.04 g) were added into a 30 mL vial according to the amounts listed in Tables 5-6. The vial was capped and a nitrogen line was connected. The reaction mixture was heated to 55° C. and stirred overnight. Samples were filtered and diluted to 10% solids with DI water, applied to fabric, and tested according to the test methods above.

TABLE 4

Preparation and Performance of Examples 1-26

| | | | Cotton Performance | | | Polyester Performance | | |
|---|---|---|---|---|---|---|---|---|
| Ex. | Core ID (Amount, g) | Shell ID (Amount, g) | Water Drop | Oil Drop | Spray Rating | Water Drop | Oil Drop | Spray Rating |
| 1 | 1 (10.00) | 2 (8.33) | 7 | 5 | 100 | 7 | 4 | 100 |
| 2 | 1 (10.08) | 3 (8.41) | 7 | 5 | 100 | 7 | 4 | 90 |
| 3 | 2 (9.80) | 1 (8.67) | 7 | 5 | 100 | 7 | 4 | 95 |
| 4 | 2 (9.41) | 2 (8.33) | 7 | 5 | 100 | 7 | 4 | 100 |
| 5 | 2 (9.42) | 3 (8.33) | 7 | 5 | 100 | 7 | 4 | 100 |
| 6 | 3 (12.80) | 2 (8.33) | 7 | 5 | 100 | 7 | 4 | 100 |
| 7 | 3 (12.81) | 3 (8.35) | 7 | 5 | 100 | 7 | 4 | 100 |
| 8 | 4 (10.00) | 2 (8.33) | 7 | 5 | 100 | 7 | 4 | 100 |
| 9 | 4 (10.00) | 3 (8.34) | 7 | 5 | 100 | 7 | 4 | 100 |
| 10 | 5 (10.99) | 2 (8.33) | 7 | 5 | 100 | 7 | 4 | 100 |
| 11 | 5 (11.00) | 3 (8.35) | 7 | 5 | 100 | 7 | 4 | 100 |
| 12 | 6 (10.00) | 2 (8.33) | 7 | 5 | 100 | 6 | 3 | 100 |

TABLE 4-continued

Preparation and Performance of Examples 1-26

| Ex. | Core ID (Amount, g) | Shell ID (Amount, g) | Cotton Performance | | | Polyester Performance | | |
|---|---|---|---|---|---|---|---|---|
| | | | Water Drop | Oil Drop | Spray Rating | Water Drop | Oil Drop | Spray Rating |
| 13 | 6 (10.15) | 3 (8.47) | 7 | 5 | 100 | 6 | 4 | 100 |
| 14 | 7 (10.01) | 2 (8.33) | 7 | 5 | 100 | 6 | 3 | 100 |
| 15 | 7 (10.02) | 3 (8.34) | 7 | 5 | 100 | 7 | 4 | 100 |
| 16 | 8 (14.66) | 1 (8.33) | 7 | 5 | 100 | 7 | 4 | 95 |
| 17 | 8 (14.64) | 2 (8.33) | 7 | 5 | 100 | 7 | 4 | 100 |
| 18 | 8 (14.65) | 3 (8.33) | 7 | 5 | 100 | 7 | 4 | 100 |
| 19 | 9 (12.35) | 2 (8.33) | 7 | 5 | 100 | 7 | 4 | 100 |
| 20 | 9 (12.35) | 3 (8.33) | 6 | 5 | 95 | 7 | 4 | 100 |
| 21 | 10 (14.41) | 2 (8.33) | 6 | 5 | 100 | 6 | 4 | 100 |
| 22 | 10 (14.42) | 3 (8.33) | 7 | 5 | 90 | 7 | 4 | 100 |
| 23 | 11 (14.90) | 2 (8.33) | 7 | 5 | 100 | 6 | 4 | 100 |
| 24 | 11 (14.91) | 3 (8.33) | 7 | 5 | 100 | 7 | 4 | 100 |
| 25 | 12 (10.00) | 2 (8.33) | 7 | 5 | 100 | 6 | 4 | 100 |
| 26 | 12 (10.00) | 3 (8.33) | 6 | 5 | 100 | 7 | 4 | 100 |
| A | Untreated fabric | | 0 | 0 | 0 | 0 | 0 | 0 |

TABLE 5

Preparation and Performance of Examples 27-48

| Ex. | Core ID (Amount, g) | Shell ID (Amount, g) | Cotton Performance | | | Polyester Performance | | |
|---|---|---|---|---|---|---|---|---|
| | | | Water Drop | Oil Drop | Spray Rating | Water Drop | Oil Drop | Spray Rating |
| 27 | 13 (9.64) | 2 (8.33) | 7 | 5 | 100 | 7 | 4 | 100 |
| 28 | 13 (9.65) | 3 (8.33) | 7 | 5 | 100 | 7 | 4 | 100 |
| 29 | 14 (9.94) | 1 (8.33) | 7 | 5 | 100 | 7 | 4 | 100 |
| 30 | 14 (9.94) | 2 (8.33) | 7 | 5 | 100 | 7 | 4 | 100 |
| 31 | 14 (9.94) | 3 (8.33) | 7 | 5 | 100 | 7 | 4 | 100 |
| 32 | 15 (10.62) | 2 (8.33) | 7 | 5 | 100 | 7 | 4 | 100 |
| 33 | 15 (10.62) | 3 (8.33) | 7 | 5 | 100 | 7 | 4 | 100 |
| 34 | 16 (9.83) | 2 (8.33) | 6 | 5 | 100 | 6 | 4 | 100 |
| 35 | 16 (9.84) | 3 (8.33) | 7 | 5 | 100 | 7 | 4 | 100 |
| 36 | 17 (9.01) | 2 (8.33) | 7 | 5 | 100 | 6 | 4 | 100 |
| 37 | 17 (9.02) | 3 (8.33) | 7 | 5 | 100 | 7 | 4 | 100 |
| 38 | 18 (8.96) | 2 (8.33) | 7 | 5 | 100 | 6 | 4 | 100 |
| 39 | 18 (8.97) | 3 (8.33) | 7 | 5 | 100 | 7 | 4 | 100 |
| 40 | 19 (10.14) | 1 (8.34) | 7 | 5 | 100 | 7 | 4 | 100 |
| 41 | 19 (10.12) | 2 (8.33) | 7 | 5 | 100 | 7 | 4 | 100 |
| 42 | 19 (10.12) | 3 (8.33) | 7 | 5 | 100 | 7 | 4 | 100 |
| 43 | 20 (10.91) | 2 (8.33) | 7 | 5 | 100 | 6 | 4 | 100 |
| 44 | 20 (10.91) | 3 (8.33) | 7 | 5 | 100 | 7 | 4 | 100 |
| 45 | 21 (10.84) | 2 (8.33) | 7 | 5 | 100 | 7 | 4 | 100 |
| 46 | 21 (10.84) | 3 (8.33) | 7 | 5 | 100 | 7 | 4 | 100 |
| 47 | 22 (9.82) | 2 (8.33) | 7 | 5 | 100 | 6 | 4 | 100 |
| 48 | 22 (9.82) | 3 (8.33) | 7 | 5 | 100 | 7 | 4 | 100 |
| A | Untreated fabric | | 0 | 0 | 0 | 0 | 0 | 0 |

Example 49

A 4-neck 500 mL round bottom flask was assembled with thermocouple, mechanical stirrer, a nitrogen inlet, condenser, and gas outlet. The flask was charged with Core 23 (80 g), Shell 4 (41.1 g), and N-(hydroxymethyl)acrylamide (48 wt % in water, 0.43 g). The mixture was sparged with nitrogen for 20 minutes, and VAZO 56 (0.15 g) was added. The reaction was heated to 55° C. and stirred overnight. Product was filtered through a milk filter and tested according to the test methods above, using blue polyester fabric.

Example 50

Example 49 was repeated, using Core 23 (80 g), Shell 4 (82.22 g), N-(hydroxymethyl)acrylamide (48 wt % in water, 0.86 g), and VAZO 56 (0.30 g).

Example 51

A 4-neck 500 mL round bottom flask was assembled with thermocouple, mechanical stirrer, a nitrogen inlet, condenser, and gas outlet. The flask was charged with Core 23 (89.72 g), 6,2-FMA (29.50 g), 7-EO MA (0.35 g), VMA-70 (14.75 g), hydroxyethyl methacrylate (1.40 g), N-methylolacrylamide (1.45 g), and dodecyl mercaptan (0.30 g). The mixture was sparged with nitrogen for 20 minutes. VAZO 67 (1.62 g) was added, and the reaction was heated to 70° C. and stirred overnight. Warm DI water (324.50 g), CHEMIDEX S (3.81 g), ETHAL LA-4 (1.38 g), acetic acid (1.95 g), and diacetin (14.60 g) were mixed into a plastic container and added to the flask. The mixture was stirred for 30 minutes at 75° C. Then the mixture was homogenized for 4 passes at 6000 psi, and MIBK was removed via rotary evaporation. The product was filtered through a milk filter, diluted to 20.0% solids, and tested according to the test methods above. Blue polyester fabric was used.

Example 52

Example 51 is repeated, using Core 23 (71.4 g), 6,2-FMA (5.90 g), 7-EOMA (0.07 g), VMA-70 (2.95 g), hydroxyethyl methacrylate (0.28 g), N-methylolacrylamide (0.29 g), dodecyl mercaptan (0.06 g), VAZO 67 (2.4 g), warm DI water (324.40 g), CHEMIDEX S (3.81 g), ETHAL LA-4 (1.38 g), acetic acid (1.95 g), and diacetin (14.60 g), reacting at 80° C. instead of 70° C.

Example 53

A 4-neck 500 mL round bottom flask was assembled with a thermocouple, mechanical stirrer, a nitrogen inlet, condenser, and gas outlet. The flask was charged with Core 23 (80 g), Shell 4 (123.33 g), and N-(hydroxymethyl)acrylamide (48 wt % solution in water, 1.29 g). The mixture was sparged with nitrogen for 20 minutes, and VAZO 56 (0.45 g) was added. The reaction was heated to 55° C. and stirred overnight. The product was filtered through a milk filter, diluted to 20.0% solids, and tested according to the test methods above. Blue polyester fabric was used.

Example 54

A 4-neck 500 mL round bottom flask was assembled with a thermocouple, mechanical stirrer, a nitrogen inlet, condenser, and gas outlet. The flask was charged with Core 23 (71.4 g) and 6,2-FMA (5.21 g). The mixture was sparged with nitrogen for 20 minutes, and VAZO 67 (2.3 g) was added. The reaction was heated to 80° C. and stirred overnight. Warm DI water (307 g), CHEMIDEX S (3.6 g), ETHAL LA-4 (1.3 g), acetic acid (1.84 g), and diacetin (13.80 g) were mixed into a plastic container and added to the flask. The mixture was stirred for 30 minutes at 75° C. and then homogenized 4 passes at 6000 psi. MIBK was removed via rotary evaporation, and the product was filtered through a milk filter and diluted to 20.0% solids. The product was tested according to the test methods above, using blue polyester fabric.

Example 55

Example 54 was repeated, using Core 23 (122.53 g), 6,2-FMA (26.05 g), VAZO 67 (1.43 g), warm DI water (286.52 g), CHEMIDEX S (3.37 g), ETHAL LA-4 (1.22 g), acetic acid (1.72 g), and diacetin (12.89 g), and reacting at 70° C. instead of 80° C.

Example 56

A 4-neck 500 mL round bottom flask was assembled with thermocouple, mechanical stirrer, a nitrogen inlet, condenser, and gas outlet. The flask was charged with Core 23 (80 g), Shell 5 (82.22 g), and N-(hydroxymethyl)acrylamide (48 wt % solution in water, 0.86 g). The mixture was sparged with nitrogen for 20 minutes, and VAZO 56 (0.30 g) was added. The reaction was heated to 55° C. and stirred overnight. The product was filtered through a milk filter, diluted to 20.0% solids, and tested according to the test methods above. Blue polyester fabric was used.

Example 57

Example 54 was repeated, using Core 27 (155.6 g), 6,2-FMA (5.72 g), VAZO 67 (2.36 g), warm DI water (315 g), CHEMIDEX S (3.70 g), ETHAL LA-4 (1.34 g), acetic acid (1.89 g), and diacetin (14.16 g).

Example 58

Example 56 was repeated, using Core 25 (64.0 g), water (16.0 g), Shell 4 (41.1 g), N-(hydroxymethyl)acrylamide (48 wt % solution in water, 0.43 g), and VAZO 56 (0.15 g).

Example 59

Example 56 was repeated, using Core 25 (64.0 g), water (16.0 g), Shell 5 (41.1 g), N-(hydroxymethyl)acrylamide (48 wt % solution in water, 0.43 g), and VAZO 56 (0.15 g).

Example 60

A 4-neck 500 mL round bottom flask was assembled with thermocouple, mechanical stirrer, a nitrogen inlet, condenser, and gas outlet. The flask was charged with Core 26 (100.0 g), water (16.0 g), and Shell 6 (112.0 g). The mixture was sparged with nitrogen for 20 minutes. N-(hydroxymethyl)acrylamide (48 wt % solution in water, 0.90 g) and vinylidene chloride (4.48 g) were added. The mixture was stirred for 10 minutes, and VAZO 56 (0.15 g) was added. The reaction was heated to 55° C. and stirred overnight. The product was filtered through a milk filter, diluted to 20.0% solids, and tested according to the test methods above, using blue polyester fabric.

TABLE 6

Preparation and Performance of Examples 49-60

| | Cotton Performance | | | Polyester Performance | | |
|---|---|---|---|---|---|---|
| Ex. | Water Drop | Oil Drop | Spray Rating | Water Drop | Oil Drop | Spray Rating |
| 49 | 8 | 6 | 100 | 6 | 5 | 100 |
| 50 | 10 | 6 | 100 | 8 | 5.5 | 100 |
| 51 | 8 | 6 | 90 | 8 | 6 | 100 |
| 52 | 5 | 2.5 | 85 | 5 | 3 | 90 |
| 53 | 10 | 6 | 100 | 8 | 5.5 | 100 |
| 54 | 5 | 1 | 85 | 4 | 2 | 80 |
| 55 | 8 | 6 | 85 | 8 | 6 | 100 |
| 56 | 10 | 6 | 100 | 8 | 5.5 | 100 |
| 57 | 5 | 2 | 75 | 4 | 2 | 70 |
| 58 | 10 | 6 | 100 | 8 | 5 | 100 |
| 59 | 10 | 6 | 100 | 8 | 5 | 100 |
| 60 | 10 | 6 | 100 | 10 | 5.5 | 100 |

What is claimed is:

1. A polymer composition comprising
   A) a first polymer selected from a poly(meth)acrylate polymer or a urethane polymer; and
   B) a second polymer selected from a urethane polymer comprising linkages of Formula I:

-Q-NHC(O)—X     (I)

or a poly(meth)acrylate polymer comprising repeat units of Formula (II):

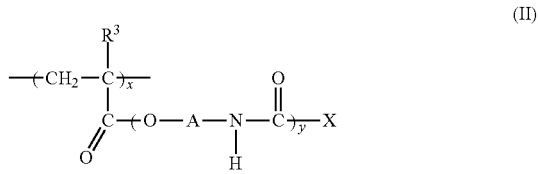

wherein
the second polymer comprises 20 to 100 mol % of structures of Formula (I) or Formula (II);
Q is the residue of an isocyanate, diisocyanate, or polyisocyanate;
X is the residue of a cyclic or acyclic sugar alcohol which is substituted with at least two $—R^1$; $—C(O)R^1$; $—(CH_2CH_2O)_n(CH(CH_3)CH_2O)_mC(O)R^1$; or mixtures thereof;
where the cyclic or acyclic sugar alcohol is selected from a saccharide, reduced sugar, aminosaccharide, aldonic acid, or aldonic acid lactone; wherein
each n is independently 0 to 20;
each m is independently 0 to 20;
m+n is greater than 0;
each $R^1$ is independently a linear or branched alkyl group having 5 to 29 carbons optionally comprising at least 1 unsaturated bond; and
$R^3$ is selected from H or a $C_1$ to $C_4$ alkyl group;
A is a linear or branched $C_1$ to $C_{10}$ alkylene group;
x is an integer from 1 to 200; and
y is 0 or 1.

2. The polymer composition of claim 1, where X is at least 50% bio-based derived.

3. The polymer composition of claim 1, where X is selected from Formulas (IIIa), (IIIb), or (IIIc):

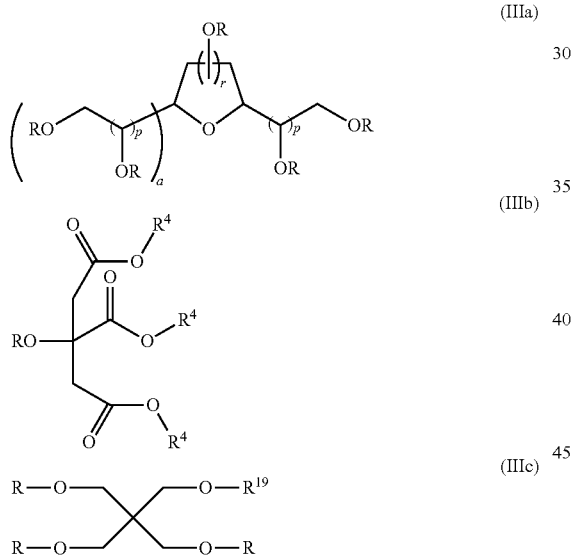

(IIIa)

(IIIb)

(IIIc)

wherein each R is independently a direct bond to C(O) of Formula I or Formula II; H; $—R^1$; $—C(O)R^1$; $—(CH_2CH_2O)_n(CH(CH_3)CH_2O)_mR^2$;
or $—(CH_2CH_2O)_n(CH(CH_3)CH_2O)_mC(O)R^1$;
each n is independently 0 to 20;
each m is independently 0 to 20;
m+n is greater than 0;
r is 1 to 3;
a is 0 or 1;
p is independently 0 to 2;
provided that a is 0 when r is 3;
each $R^1$ is independently a linear or branched alkyl group having 5 to 29 carbons optionally comprising at least 1 unsaturated bond;
each $R^2$ is independently —H, or a linear or branched alkyl group having 6 to 30 carbons optionally comprising at least 1 unsaturated bond;

or a mixtures thereof,
provided when X is Formula (IIIa), then at least one R is a direct bond to C(O) of Formula I or Formula II; and at least two R is a $—R^1$; $—C(O)R^1$;
or $—(CH_2CH_2O)_n(CH(CH_3)CH_2O)_mC(O)R^1$;
each $R^4$ is independently a direct bond to C(O) of Formula I or Formula II, —H, a linear or branched alkyl group having 6 to 30 carbons optionally comprising at least 1 unsaturated bond, or combinations thereof;
$—(CH_2CH_2O)_n(CH(CH_3)CH_2O)_mR^2$,
or $—(CH_2CH_2O)_n(CH(CH_3)CH_2O)_mC(O)R^1$;
provided when X is Formula (IIb), then at least one R or $R^4$ is a direct bond to C(O) of Formula I or Formula II; and at least two R or $R^4$ is a linear or branched alkyl group optionally comprising at least 1 unsaturated bond, or combinations thereof;
or $—(CH_2CH_2O)_n(CH(CH_3)CH_2O)_mC(O)R^1$; and
each $R^{19}$ is a direct bond to C(O) of Formula I or Formula II, —H, $—C(O)R^1$, or $—(CH_2CH_2O)_n(CH(CH_3)CH_2O)_mR^2$; or $—(CH_2CH_2O)_n(CH(CH_3)CH_2O)_mC(O)R^1$,
provided when X is Formula (IIc), then at least one $R^{19}$ or R is a direct bond to C(O) of Formula I or Formula II; and at least two $R^{19}$ or R is $—C(O)R^1$,
or $—(CH_2CH_2O)_n(CH(CH_3)CH_2O)_mC(O)R^1$.

4. The polymer composition of claim 3 wherein X is selected from Formula (IIIa) to be Formula (IIIa'):

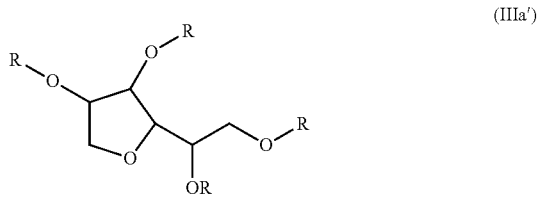

(IIIa')

wherein R is further limited to independently a direct bond to C(O) of Formula I or Formula II, —H, $—R^1$, or $—C(O)R^1$.

5. The polymer composition of claim 3 wherein X is selected from Formula (IIIa) to be Formula (IIIa'):

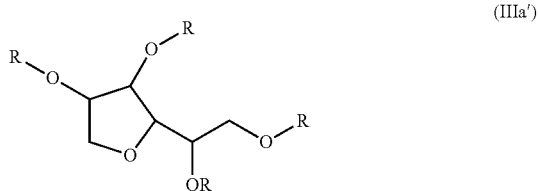

(IIIa')

wherein R is further limited to independently a direct bond to C(O) of Formula I or Formula II, —H; $—(CH_2CH_2O)_n(CH(CH_3)CH_2O)_mR^2$; or $—(CH_2CH_2O)_n(CH(CH_3)CH_2O)_mC(O)R^1$.

6. The polymer composition of claim 1, wherein the second polymer (B) is a poly(meth)acrylate polymer.

7. The polymer composition of claim 6, having a core-shell structure selected from a poly(meth)acrylate polymer (B) core and poly(meth)acrylate polymer (A) shell, a poly(meth)acrylate polymer (B) core and urethane polymer (A) shell, or a urethane (A) core and poly(meth)acrylate polymer (B) shell.

8. The polymer composition of claim 1, wherein the second polymer (B) is a urethane polymer.

9. The polymer composition of claim 8, having a core-shell structure selected from a urethane polymer (B) core and poly(meth)acrylate polymer (A) shell or a poly(meth)acrylate polymer (A) core and urethane polymer (B) shell.

10. The polymer composition of claim 1, wherein the first polymer (A) is chemically bonded to the second polymer (B).

11. The polymer composition of claim 1, where one or more of the first or second polymers contains fluoroalkyl functional groups.

12. The polymer composition of claim 8, wherein the second polymer further comprises at least one linkage selected from Formulas (IVa), (IVb), (IVc), or mixtures thereof:

$$R^6-D \quad \text{(IVa)},$$

$$R^{15}—(OCH_2CH(OR^{16})CH_2)_z—OR^{17} \quad \text{(IVb)},$$

$$—NH—C(O)—NH—X \quad \text{(IVc)}$$

wherein D is selected from —N($R^{12}$)—C(O)—NH—, —OC(O)NH—, —C(O)NH—, —SC(O)NH—, —O—($CH_2CH_2O)_s(CH(CH_3)CH_2O)_t$—C(O)NH—, or —[C(O)]—O—($CH_2CH_2O)_s(CH(CH_3)CH_2O)_t$—C(O)NH—;

X is defined as above;

$R^6$ is selected from a —$C_1$ to $C_{30}$ linear or branched alkyl optionally comprising at least one unsaturated group, a $C_1$ to $C_{20}$ linear or branched fluoroalkyl optionally interrupted by O, $CH_2$, $CH_2CH_2$, or $SO_2NH$, a hydroxy- or urethane-functional $C_1$ to $C_{30}$ linear or branched alkyl, a hydroxy- or urethane-functional linear or branched $C_1$ to $C_{30}$ polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional $C_1$ to $C_{30}$ linear or branched alkyl, an amine- or urea-functional $C_1$ to $C_{30}$ linear or branched alkyl,

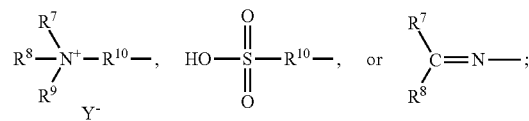

wherein $R^7$, $R^8$, and $R^9$ are each independently, —H, —$C_1$ to $C_6$ alkyl, or combinations thereof;

$R^{19}$ is a divalent alkyl group of 1 to 20 carbons;

$R^{12}$ is —H or a monovalent $C_1$ to $C_6$ alkyl group;

$R^{15}$, $R^{16}$, and $R^{17}$ are each independently a —H; —C(O)NH—, —$R^{18}$; —C(O)$R^{18}$ provided that at least one $R^{15}$, $R^{16}$, or $R^{17}$ is a —C(O)NH—;

$R^{18}$ is independently a linear or branched alkyl group having 5 to 29 carbons optionally comprising at least 1 unsaturated bond;

z is 1 to 15;

Y is Cl;

s is an integer of 0 to 50;

t is an integer of 0 to 50; and s+t is greater than 0.

13. The polymer composition of claim 6, wherein the second polymer further comprises at least one repeat unit from an ethylenically unsaturated monomer selected from linear or branched alkyl (meth)acrylates, amino and diamino (meth)acrylates, linear or branched fluoroalkyl (meth)acrylates optionally interrupted by O, $CH_2$, $CH_2CH_2$, or $SO_2NH$, alkoxylated (meth)acrylates, (meth)acrylic acid, vinyl or vinylidene chloride, glycidyl (meth)acrylate, vinyl acetate, hydroxyalkylene (meth)acrylate, urethane or urea (meth)acrylates, N-methyloyl (meth)acrylamide, alkoxyalkyl (meth)acrylamide, styrene, alpha-methylstyrene, chloromethyl-substituted styrene, ethylenediol di(meth)acrylate, 2-acrylamido-2-methyl-1-propane sulfonic acid (AMPS), and maleic anhydride.

14. The polymer composition of claim 1, further comprising water to form an aqueous emulsion or aqueous dispersion.

* * * * *